(12) United States Patent
Rieffanaugh, Jr.

(10) Patent No.: US 9,235,619 B2
(45) Date of Patent: *Jan. 12, 2016

(54) FORMULAIC CONJOINED PROJECT EFFORT INSTANCE DISPLAY METHOD AND SEARCH SYSTEM PROCESS THEREOF

(71) Applicant: Neal King Rieffanaugh, Jr., Newport Beach, CA (US)

(72) Inventor: Neal King Rieffanaugh, Jr., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,886

(22) Filed: Jul. 30, 2014

(65) Prior Publication Data

US 2015/0032772 A1    Jan. 29, 2015

Related U.S. Application Data

(63) Continuation of application No. 13/350,680, filed on Jan. 13, 2012, now Pat. No. 8,825,607.

(51) Int. Cl.
*G06F 17/30* (2006.01)
*G06Q 10/00* (2012.01)

(52) U.S. Cl.
CPC .... *G06F 17/30477* (2013.01); *G06F 17/30554* (2013.01); *G06Q 10/00* (2013.01)

(58) Field of Classification Search
USPC .................. 707/607, 608, 687, 705, 709, 813
See application file for complete search history.

(56) References Cited

U.S. PATENT DOCUMENTS

| | | | | |
|---|---|---|---|---|
| 2004/0229685 | A1* | 11/2004 | Smith | A63F 13/10 463/29 |
| 2009/0069344 | A1* | 3/2009 | Conte | C07D 277/62 514/255.02 |
| 2009/0092684 | A1* | 4/2009 | Wang | A61K 31/11 424/649 |

* cited by examiner

*Primary Examiner* — Sana Al Hashemi

(57) ABSTRACT

A Dynamic Live System for collecting, inputting, storing, and reporting Element Effort Event Data, whose processes upon query enable the reporting of well formatted Formulaic Conjoined Project Effort Instance (CPEI) Reports per the System's Who did What in Phasetime Effort Instance Formulas in Primary, Secondary, Tertiary, Auto Displays, and Inferences, not stored as displayed in Systems base tables. The formulas $5^{th}$ Element permits effort instances to be reported as past, present and future CPEI displays, regardless if said element effort event data was inputted by an element directly or generated automatically by the system's use of AI type techniques. Dynamically generated well formatted CPEI report displays incorporate functional interaction designed attributes that hyperlink formula primitives by their CPEI associations, whether or not said associations are acknowledged as credited efforts by a project owner. Functional interaction designed virtual data tables permit rated report displays per formulaic CPEI element virtual data field fulfillment.

11 Claims, 27 Drawing Sheets

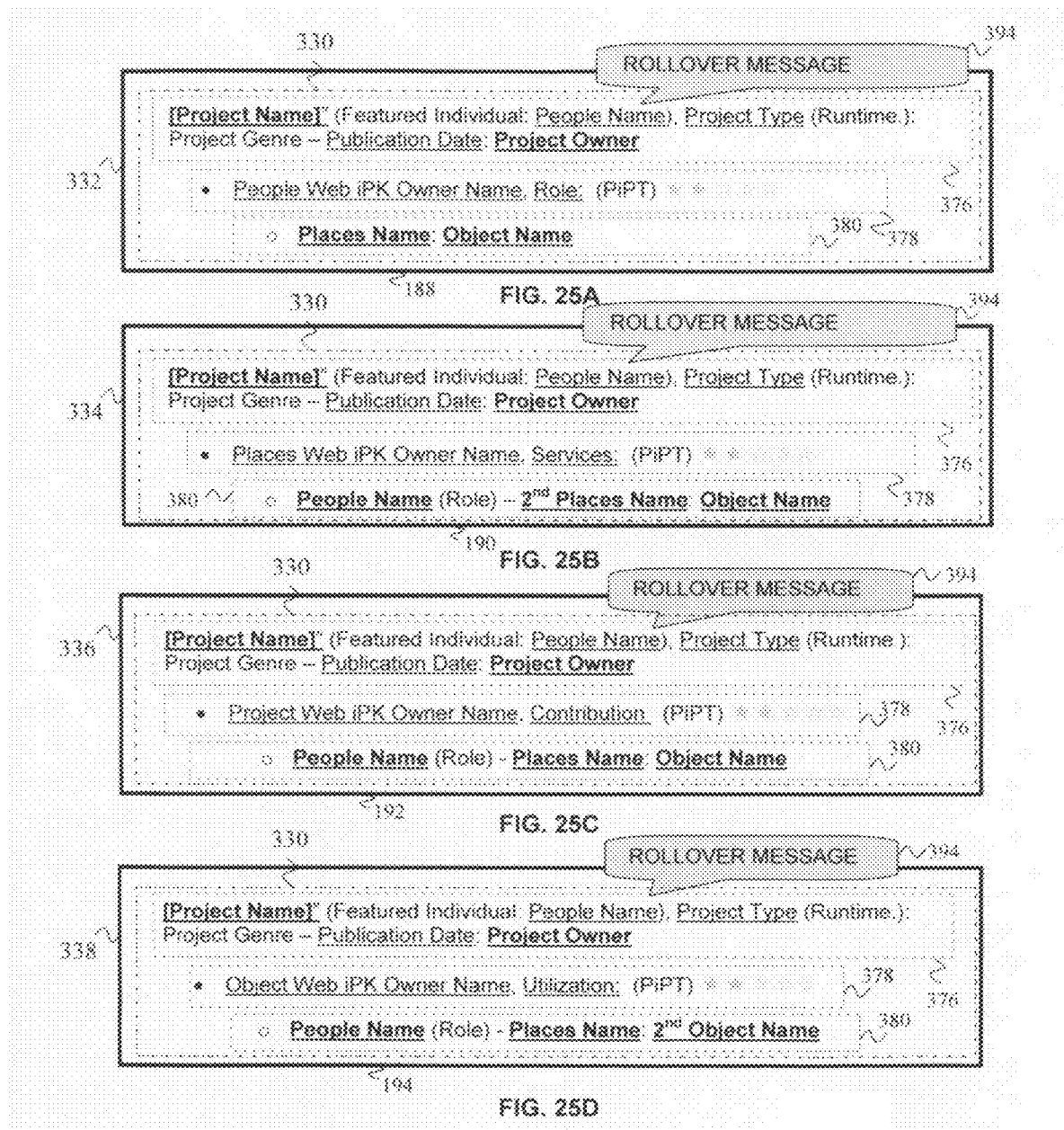

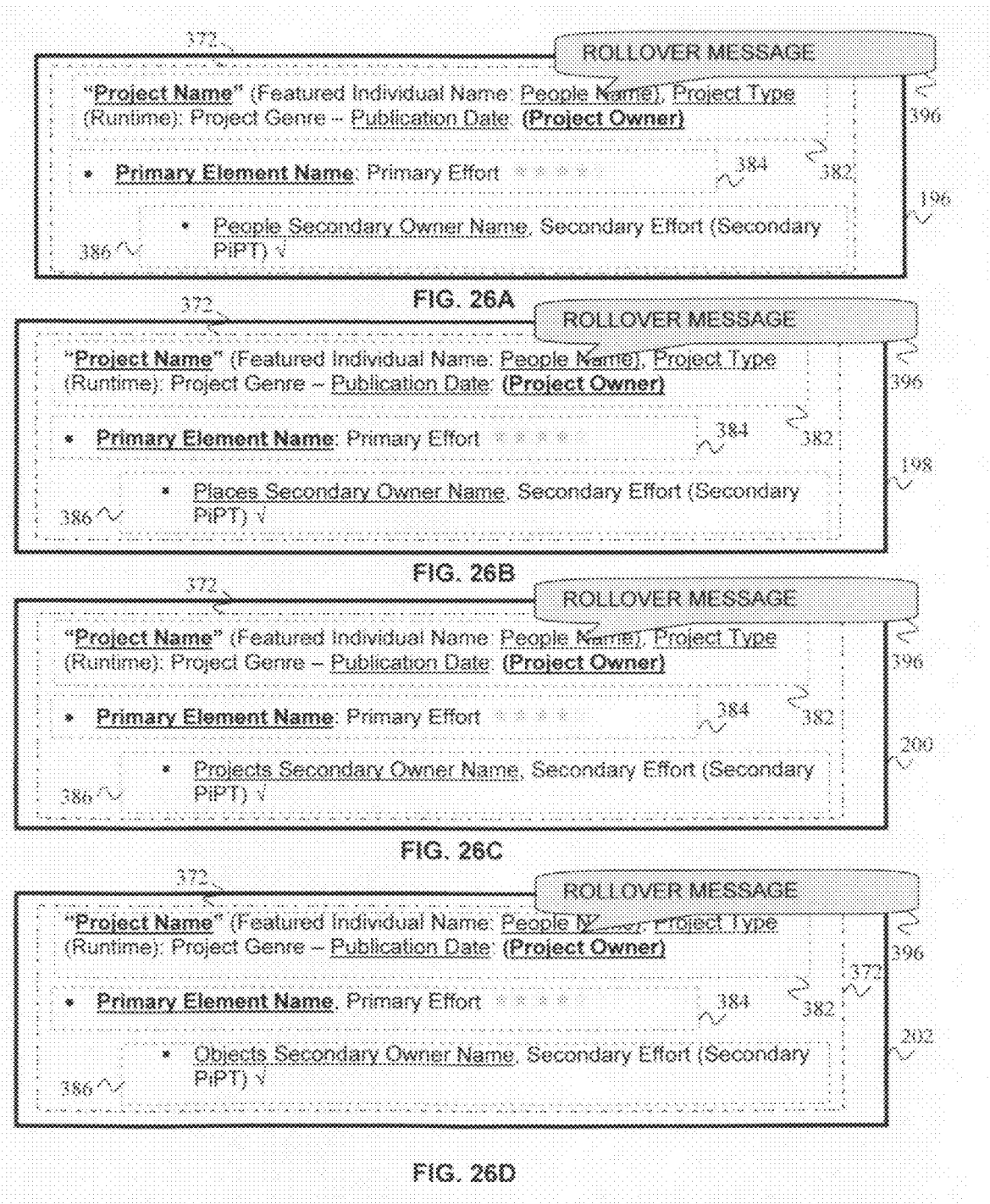

Figure 1:
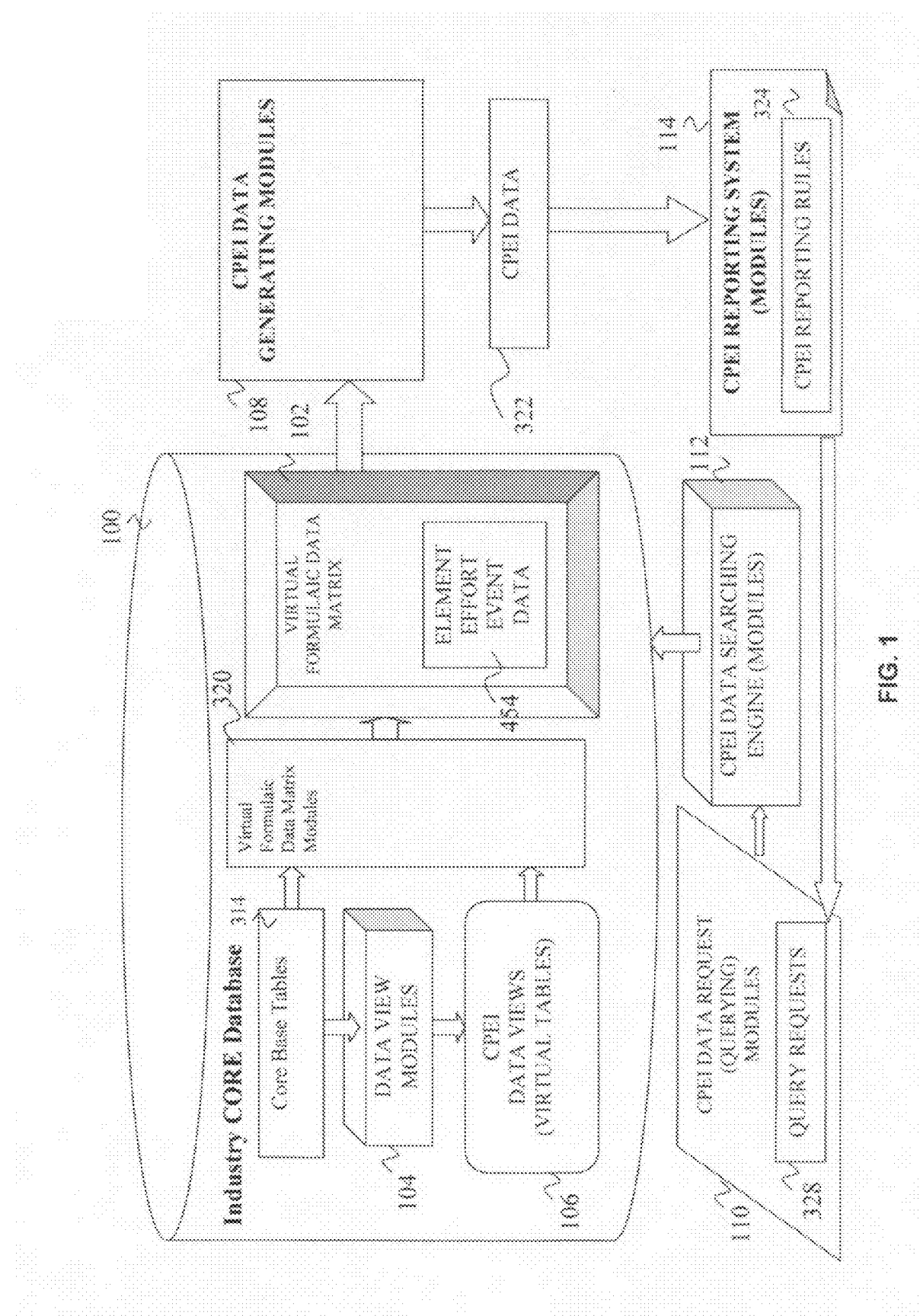

FORMULAIC CONJOINED PROJECT EFFORT INSTANCE DISPLAY METHOD AND SEARCH SYSTEM PROCESS THEREOF

CROSS-REFERENCE TO RELATED APPLICATIONS

This is a Continuation application that claims the benefit of priority under 35 U.S.C. sctn. 119 to a Non-Provisional application Ser. No. 13/350,680 filed Jan. 13, 2012.

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

"Not Applicable"

STATEMENT REGARDING PRIOR DISCLOSURES BY THE INVENTOR OR A JOINT INVENTOR

"Not Applicable"

BACKGROUND OF THE INVENTION

1. Field of Invention

The present invention is directed to a dynamic live computer-based database formula method and infrastructure search system thereof, which when queried, conjoins project effort instance report data from formula input and stored data, into well formatted functional interaction designed rated CPEI displays that hyperlink element Primary, Secondary, Tertiary, Auto Efforts and Auto Inference Associations to CPEI associations, whether or not efforts are credited by a project owner and whether or not efforts are inputted by an element or generated from other inputted element effort event data automatically.

2. Description of Related Art Including Information Disclosed Under 37 CFR 1.97 and 1.98

No related art was found for Formulaic reporting of Element Effort Event Data.

BRIEF SUMMARY OF THE INVENTION

Referring to the drawings of the invention, a Formulaic Conjoined Project Effort Instance Display Method and Search System Process Thereof are illustrated. It is understood that the components could be designed, arranged and developed in a myriad of configurations not displayed. It is also understood that the following detailed description of the present invention as referenced in the drawings is not intended to limit the scope of the present invention as claimed, but is only for illustration of the preferred embodiment of the present invention.

The present preferred embodiment of the invention will best be understood by reference to the drawings, wherein like parts are designated by like numerals throughout.

BRIEF DESCRIPTION OF THE SEVERAL VIEWS OF THE DRAWING(S)

Figure 2:
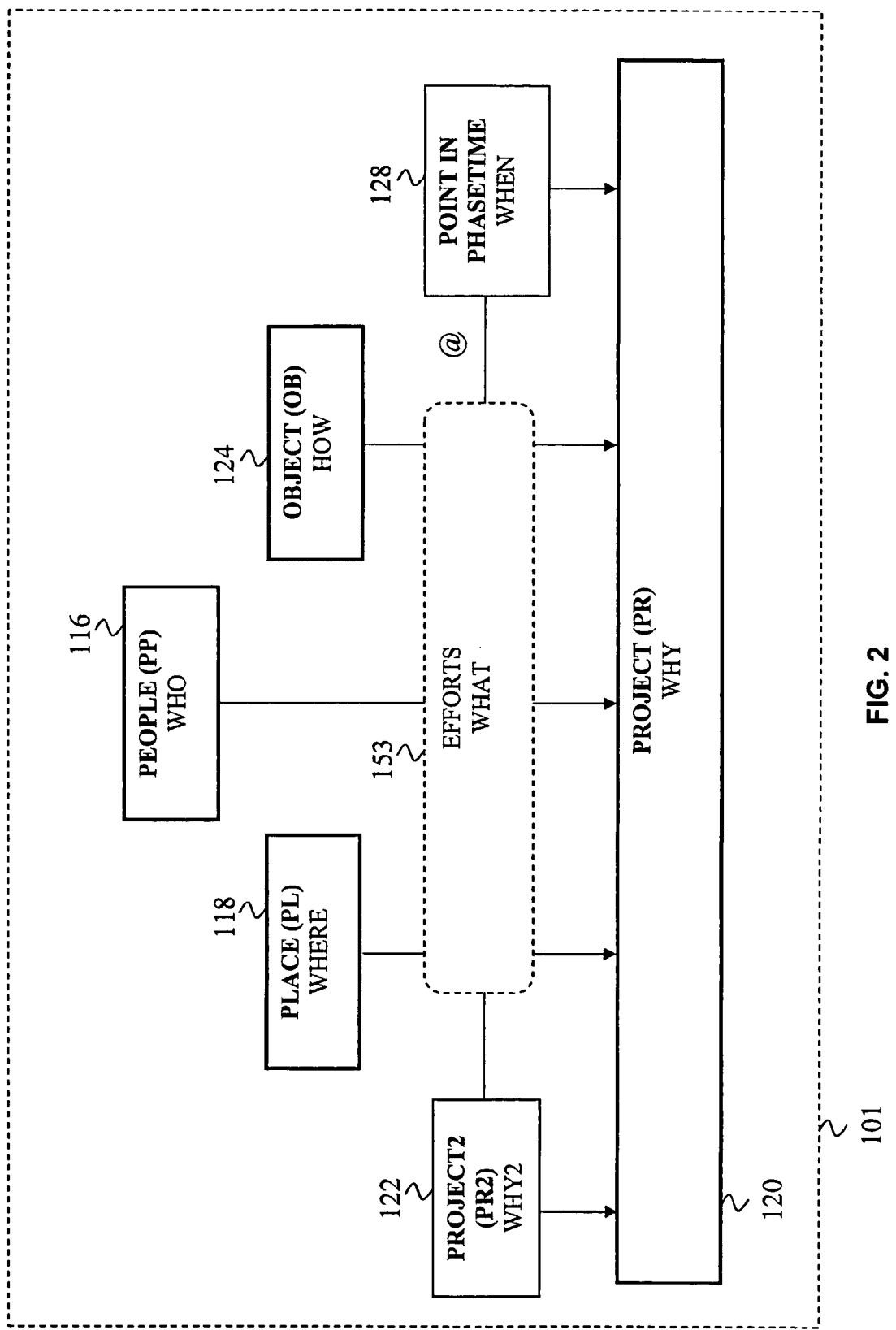
Figure 3:
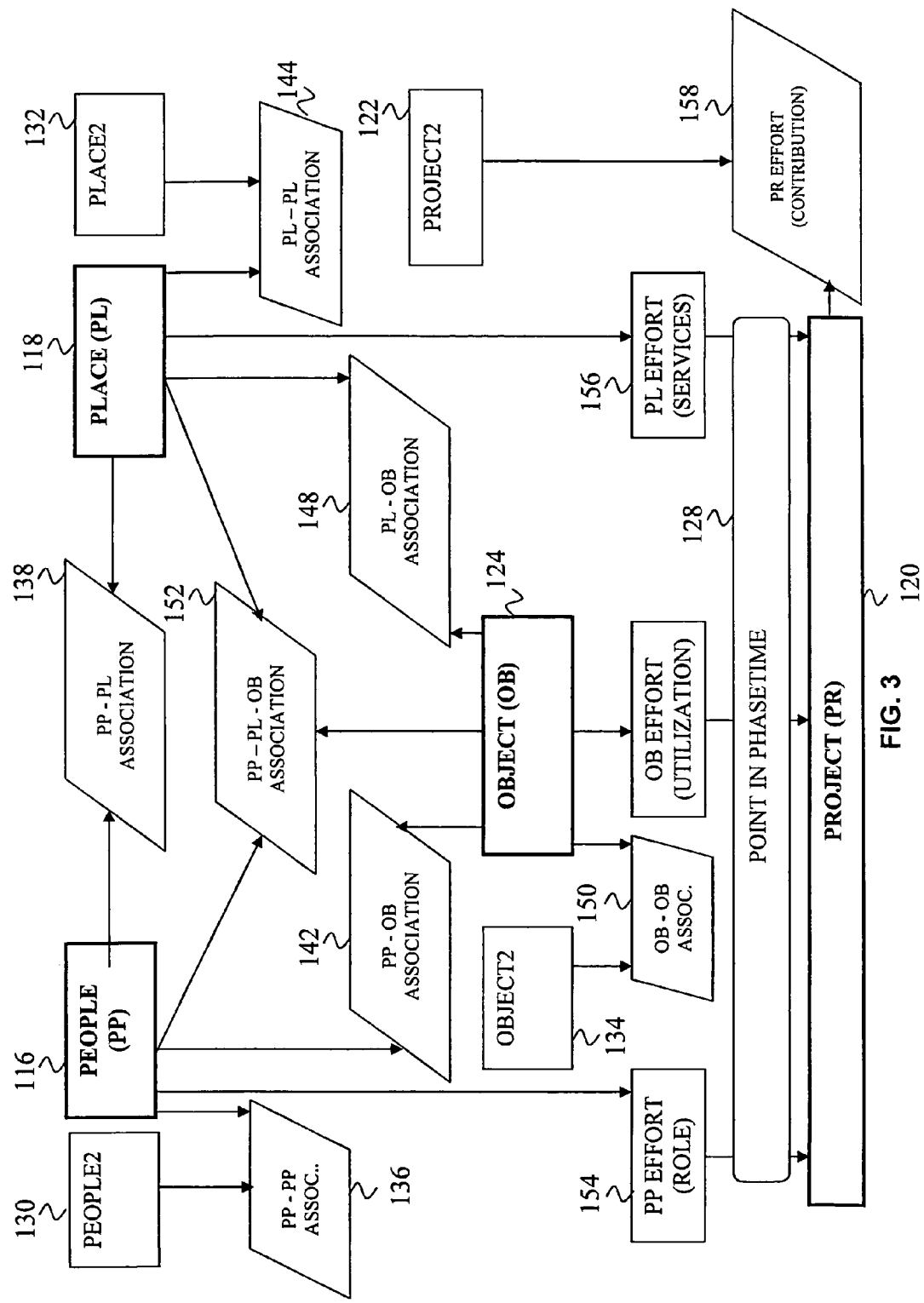
Figure 4:
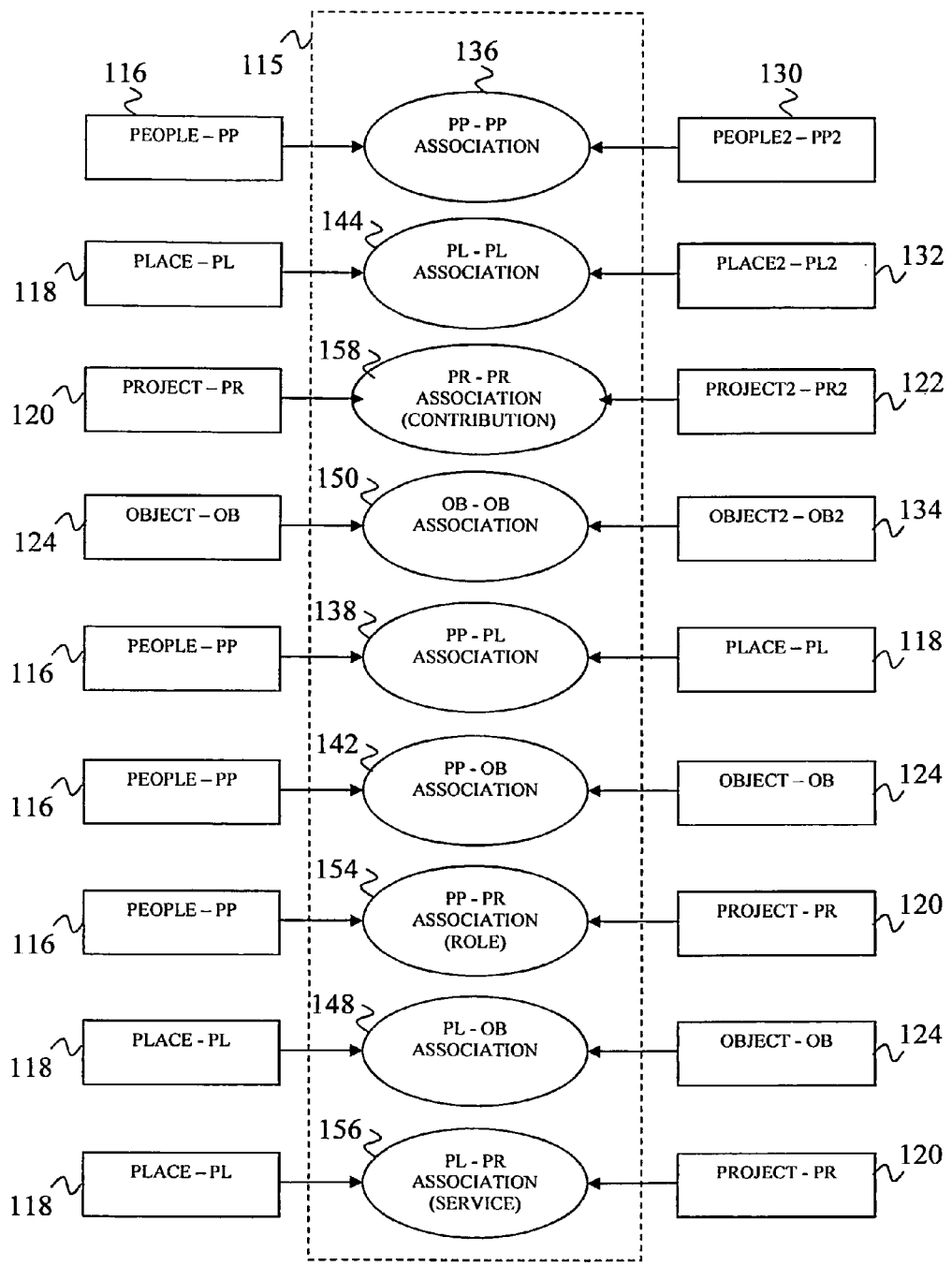
Figure 5:
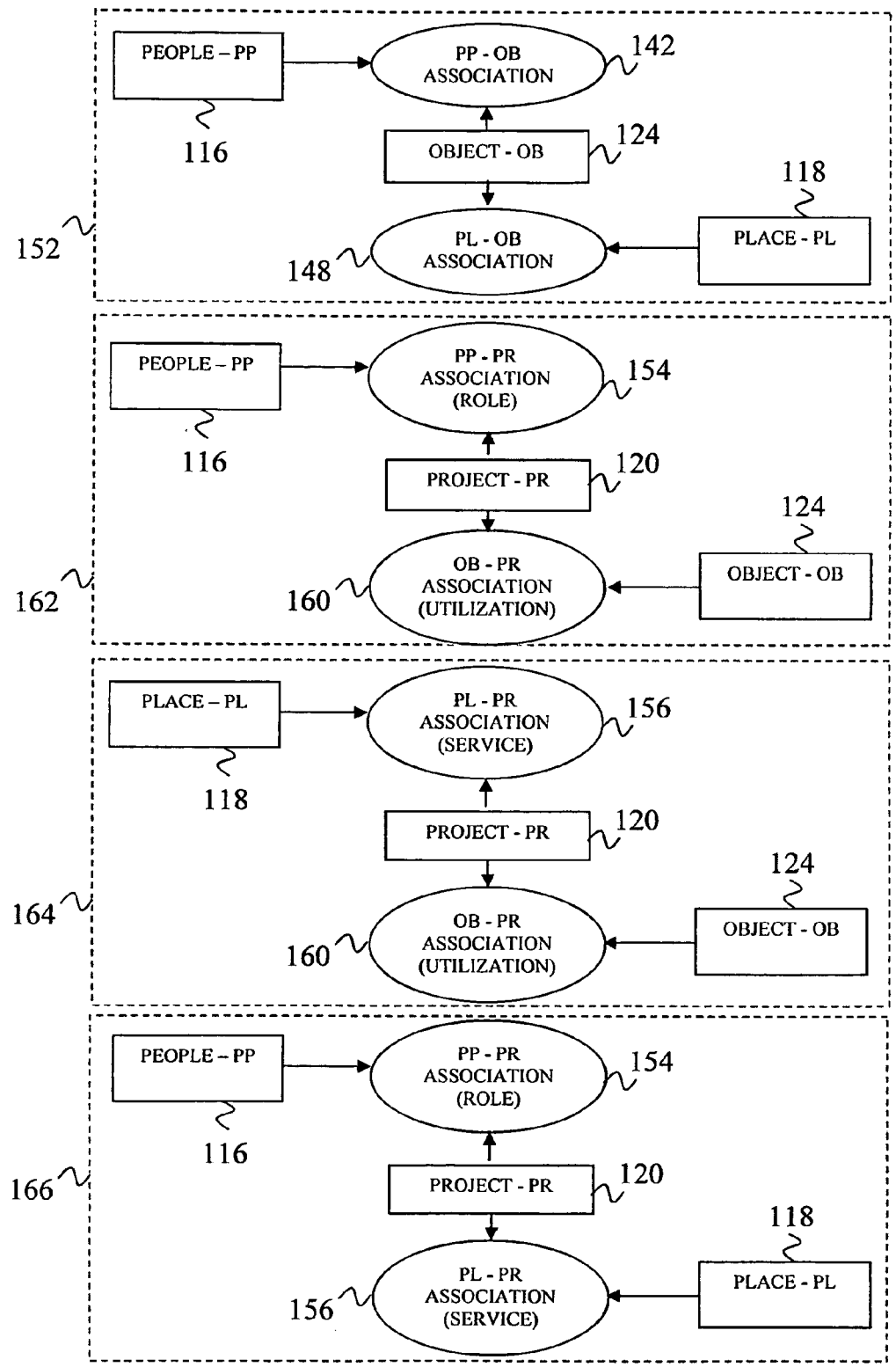
Figure 6:
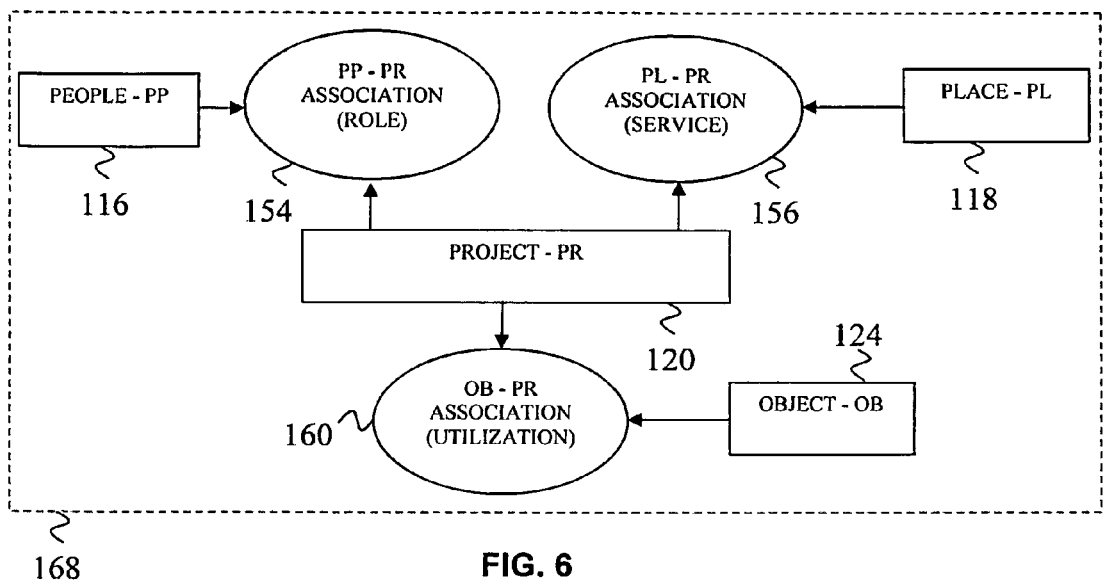
Figure 7:
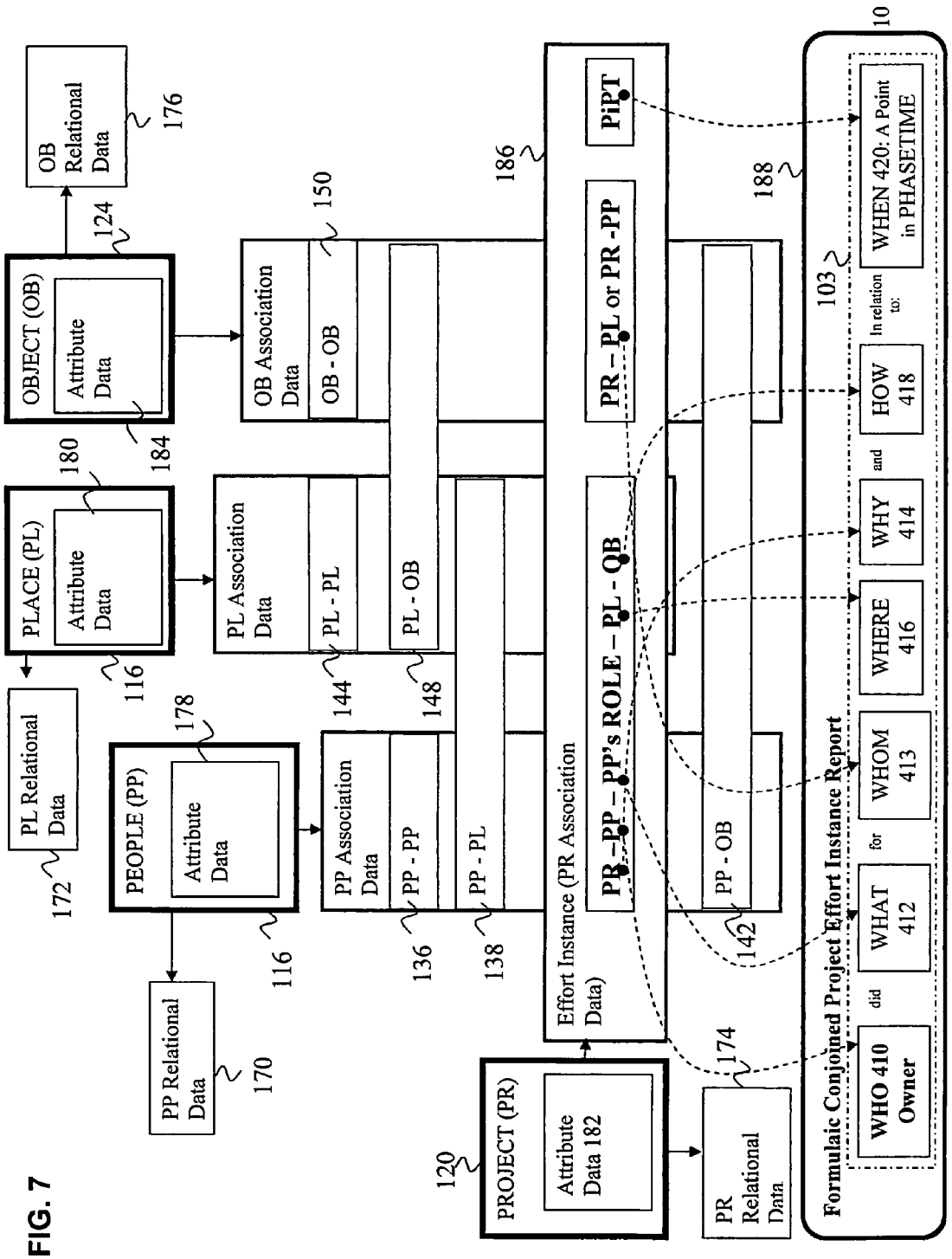
Figure 8:
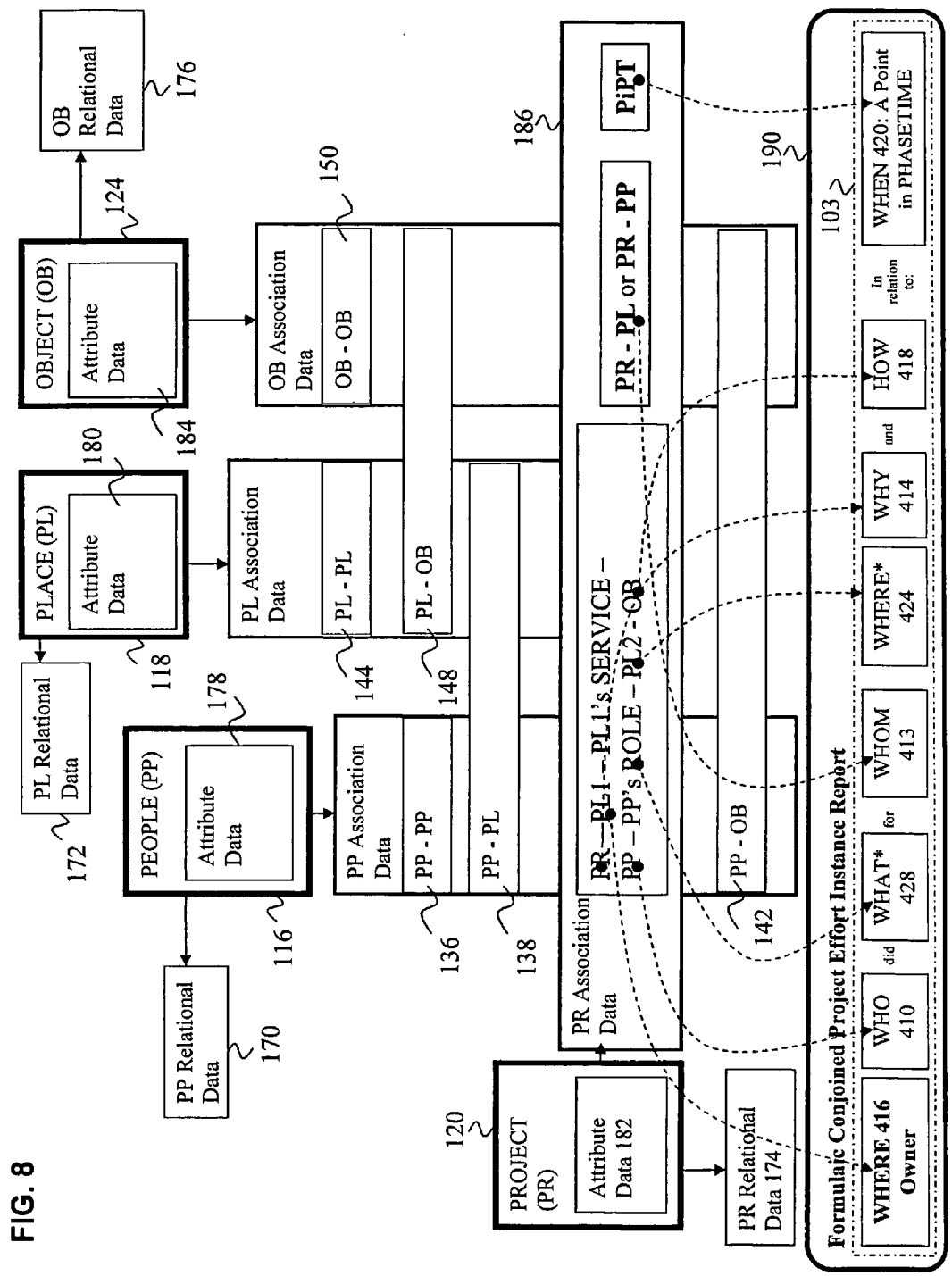
Figure 9:
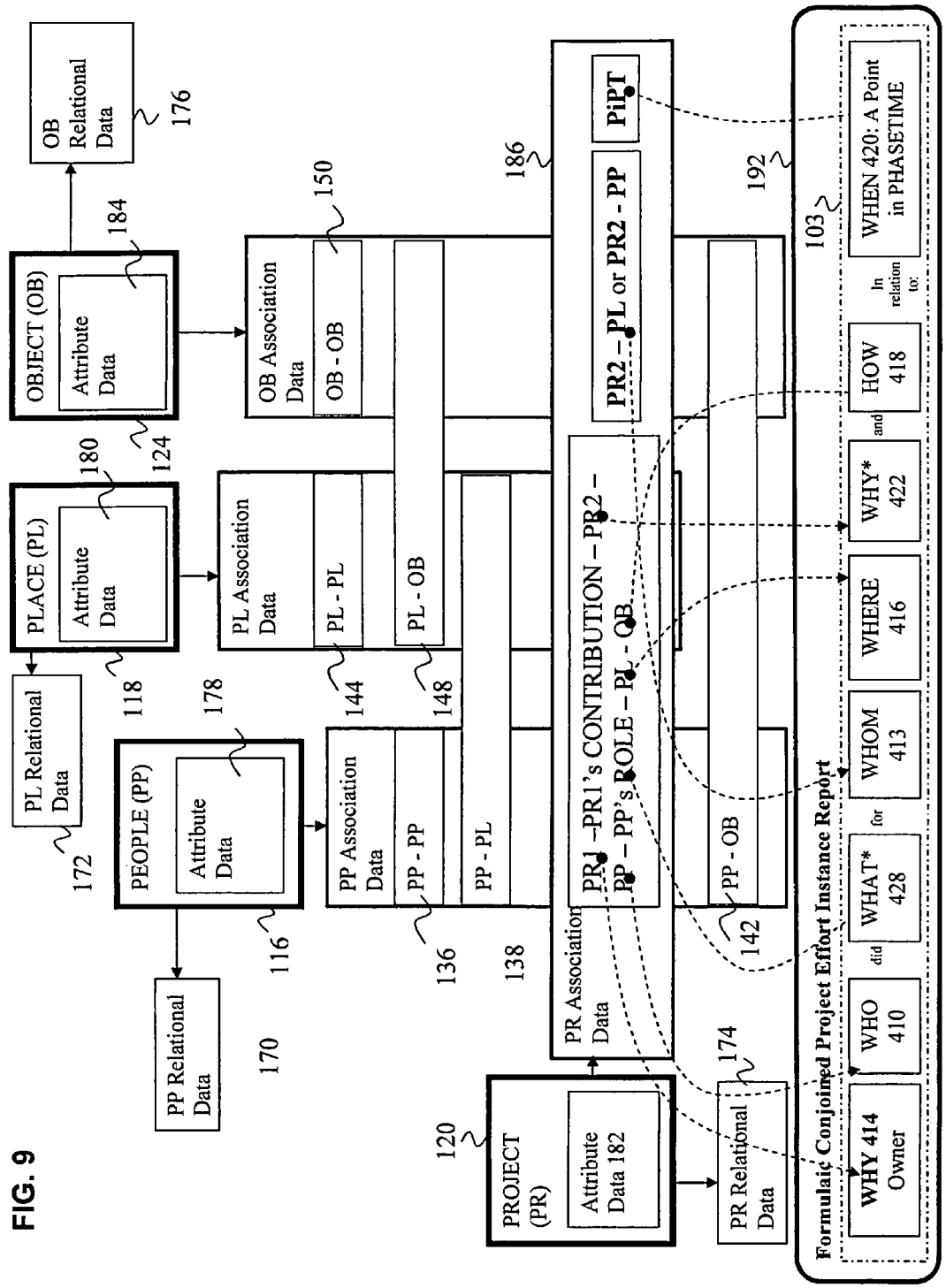
Figure 10:
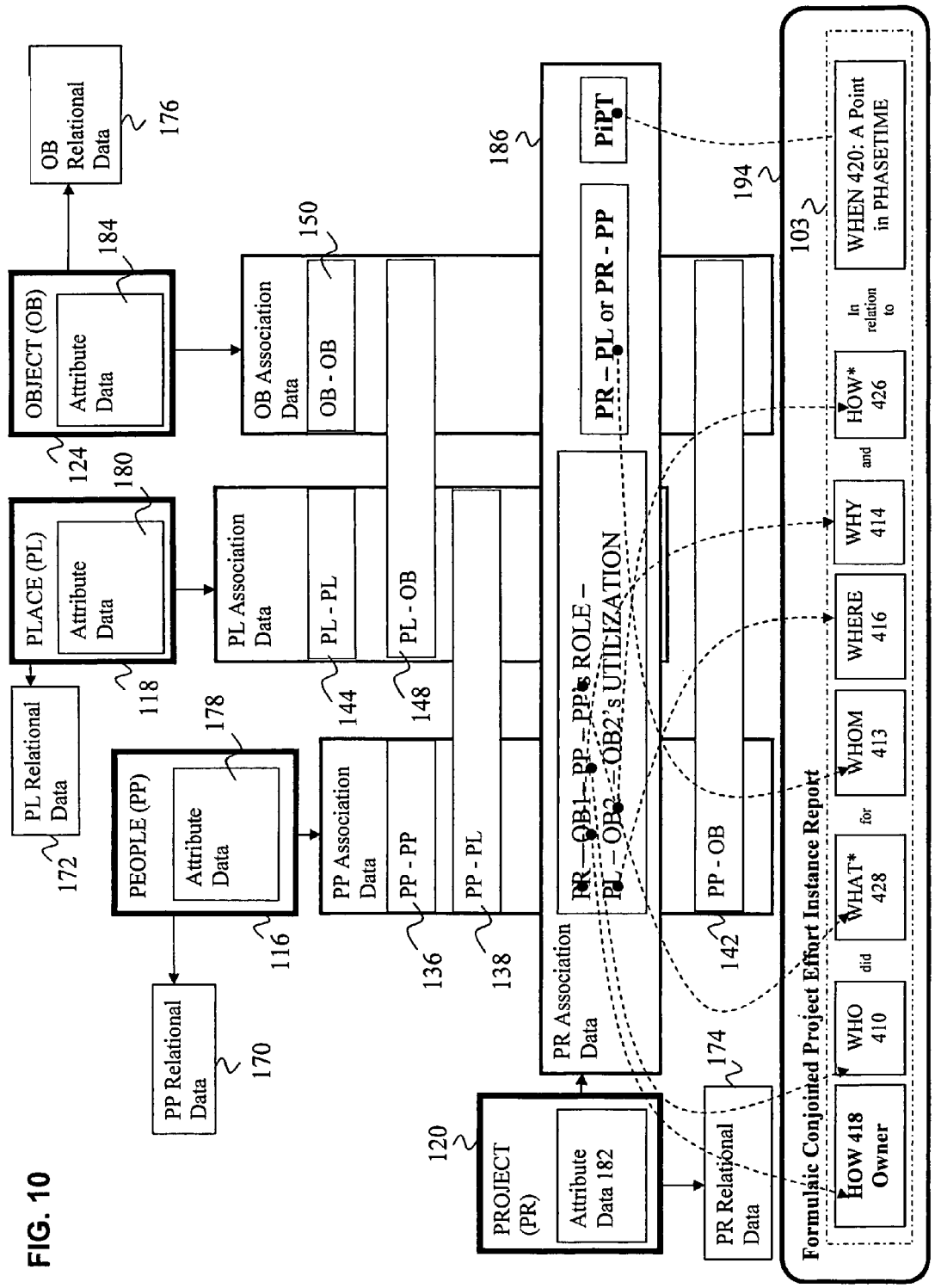
Figure 11:
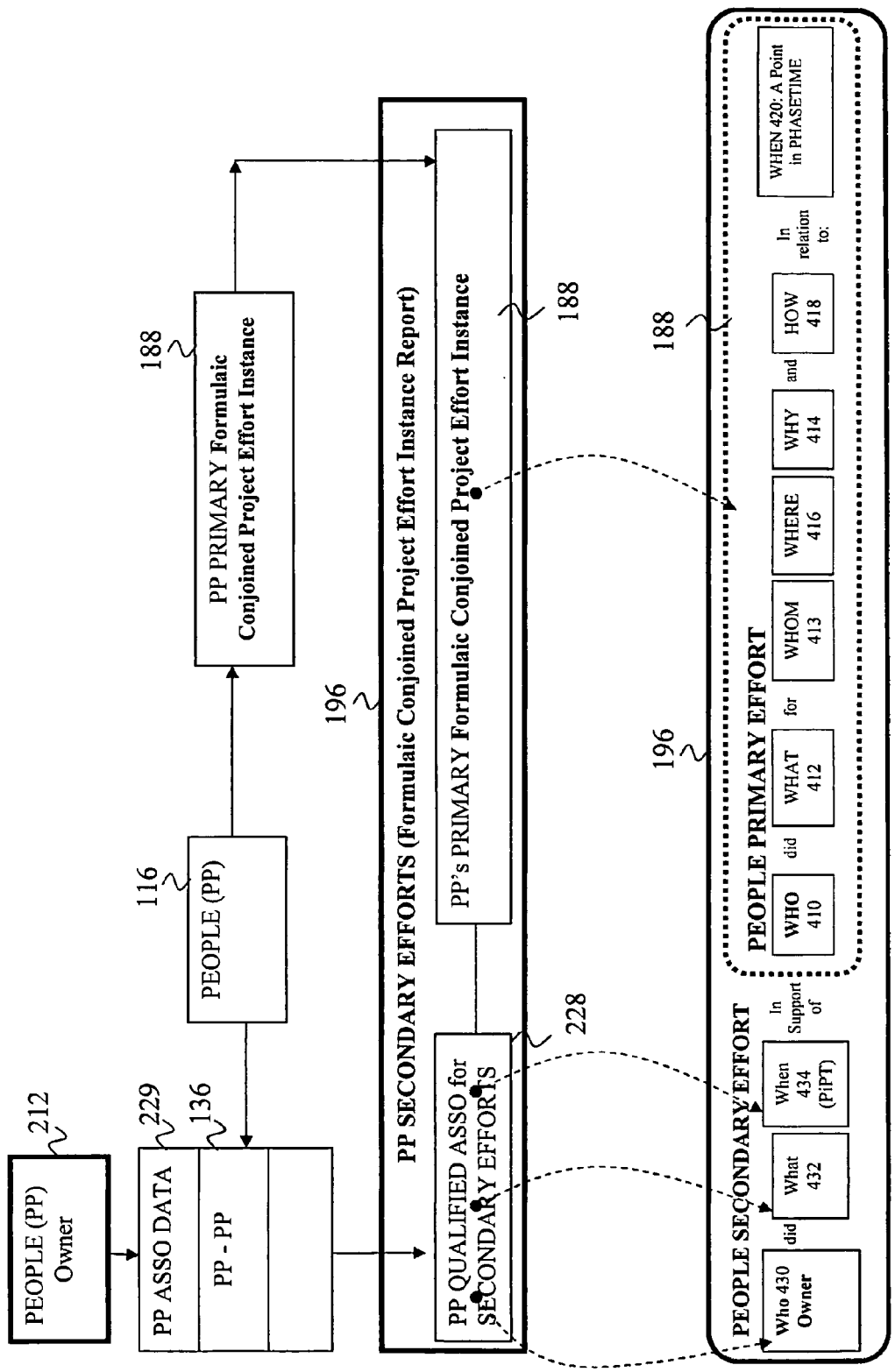
Figure 12:
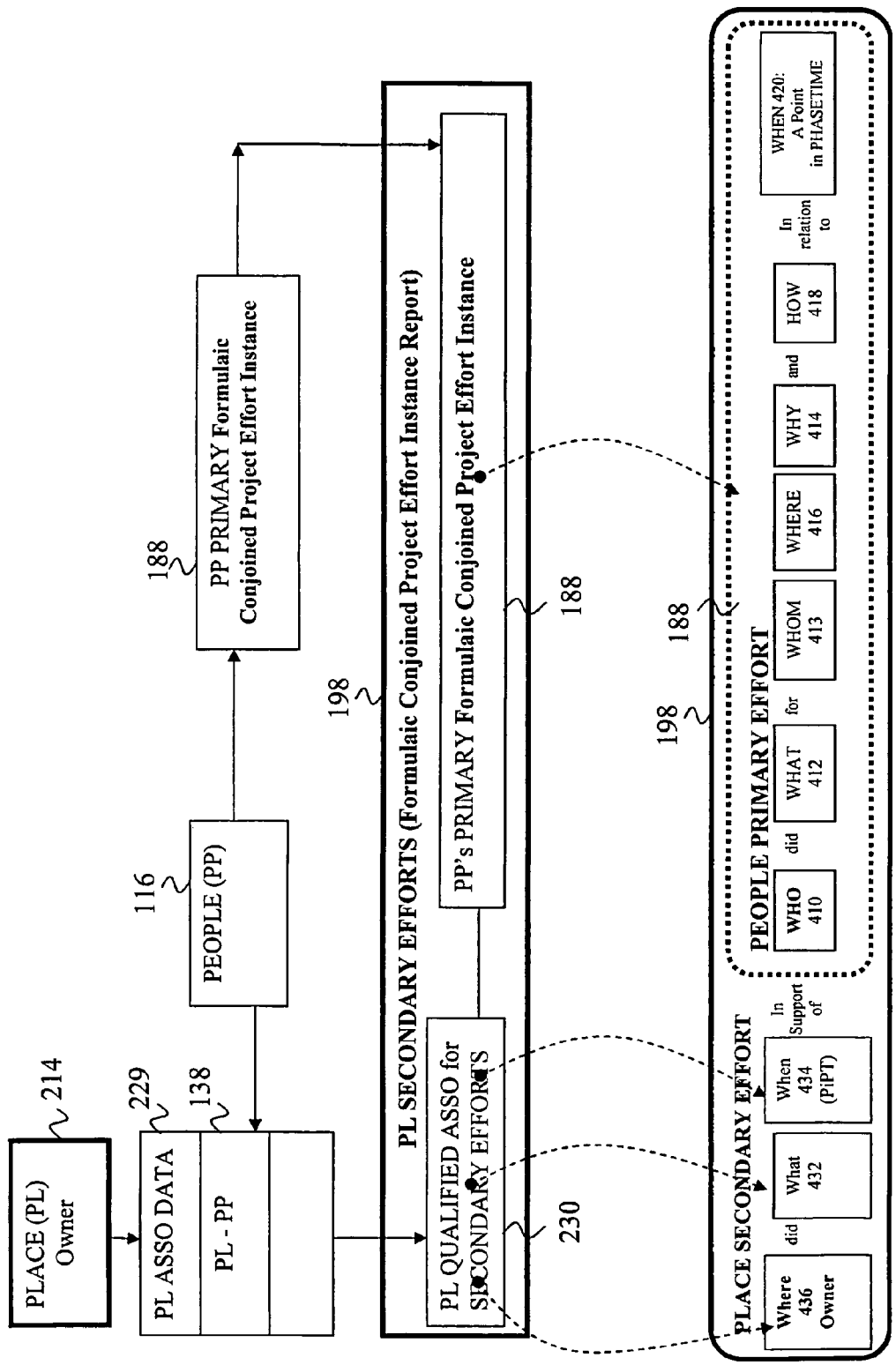
Figure 13:
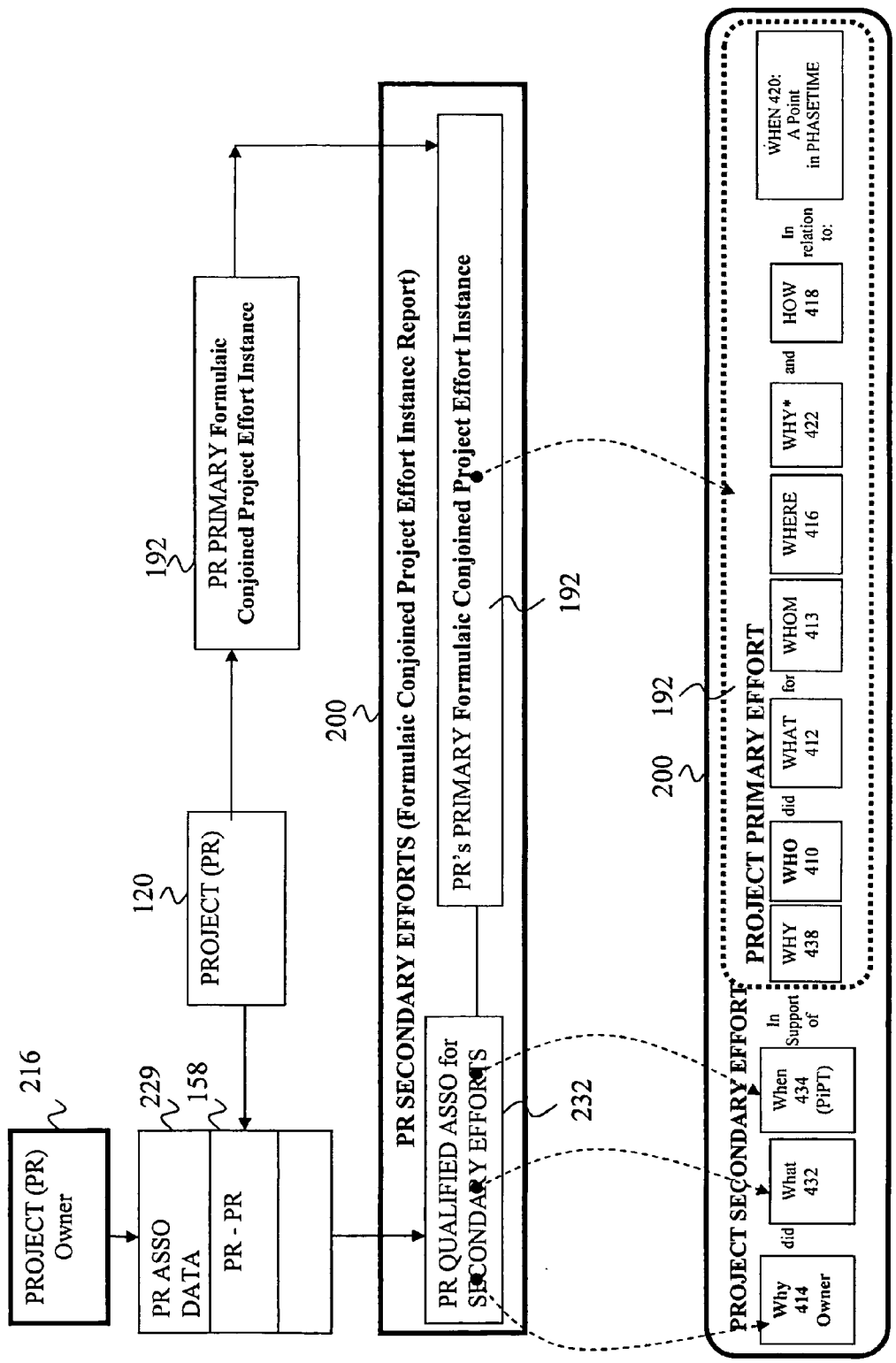
Figure 14:
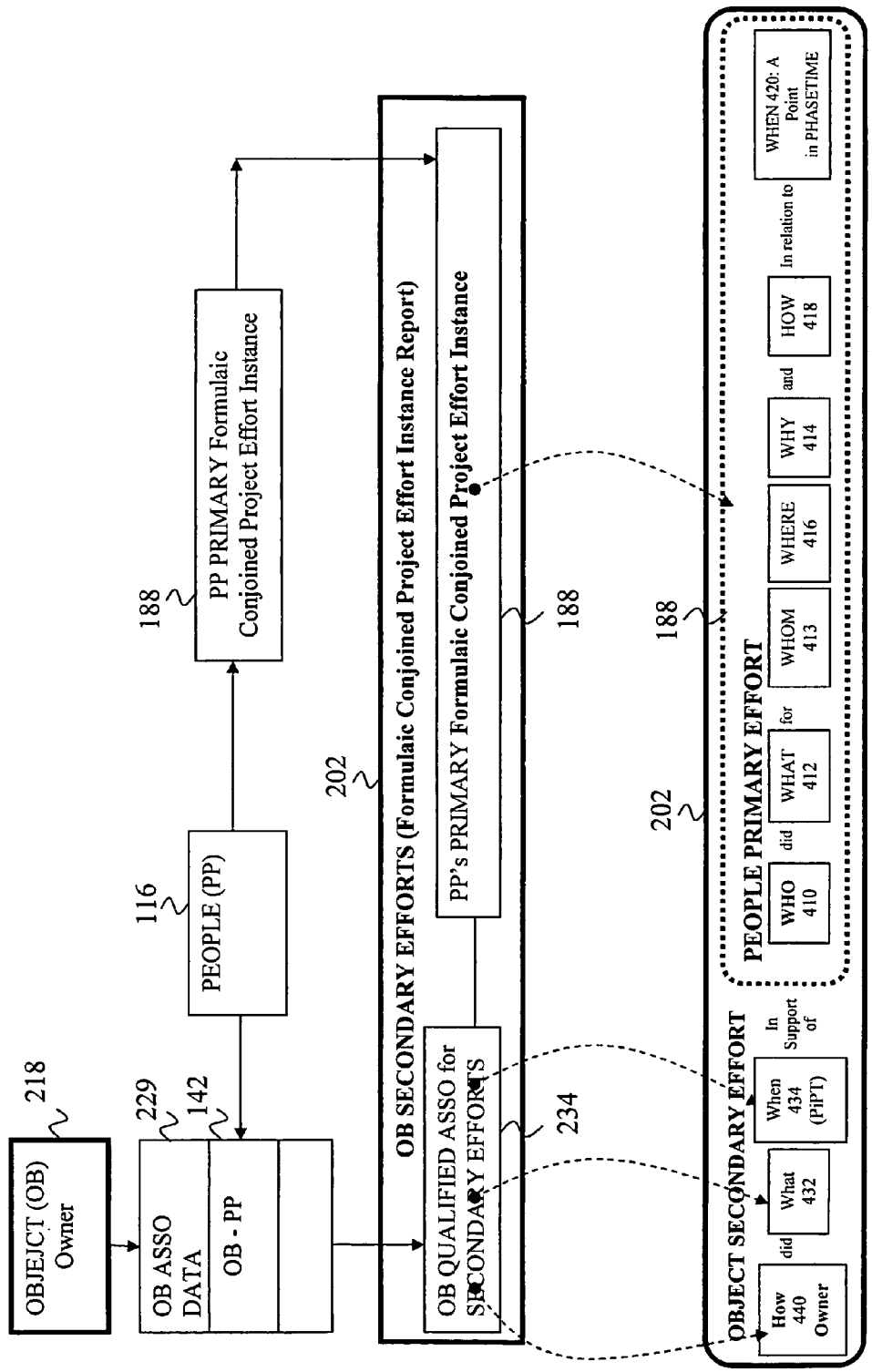
Figure 15:
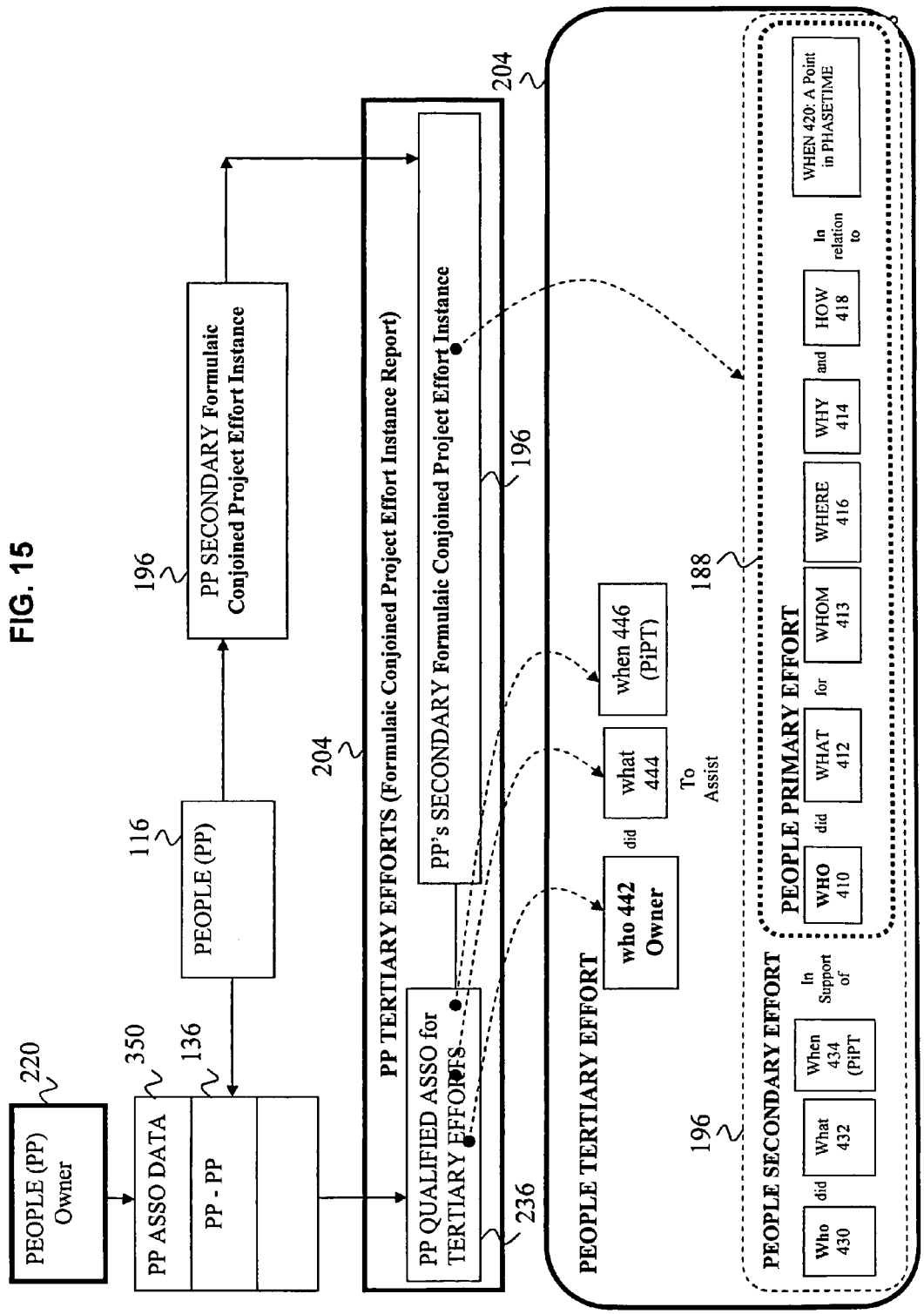
Figure 16:
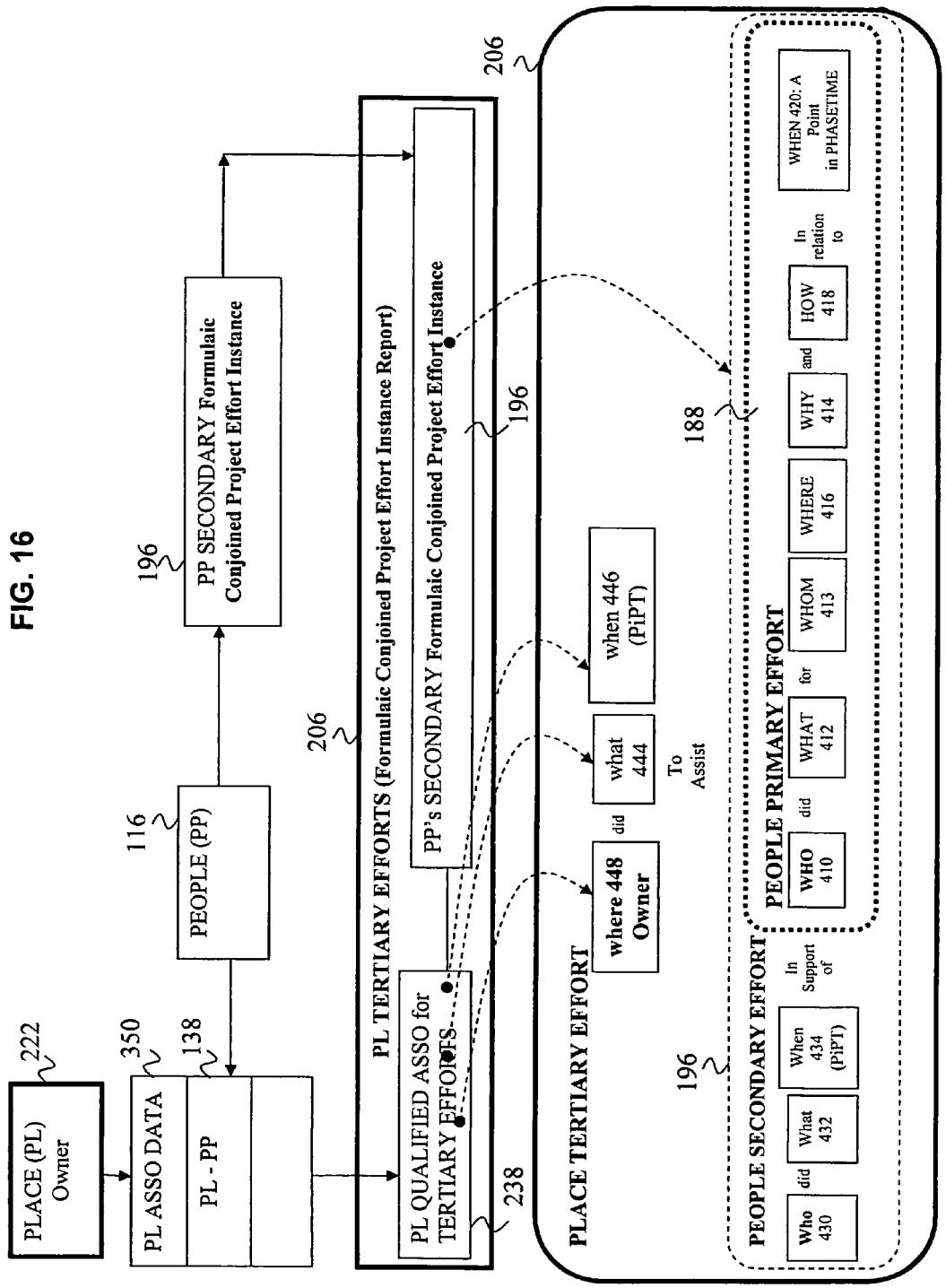
Figure 17:
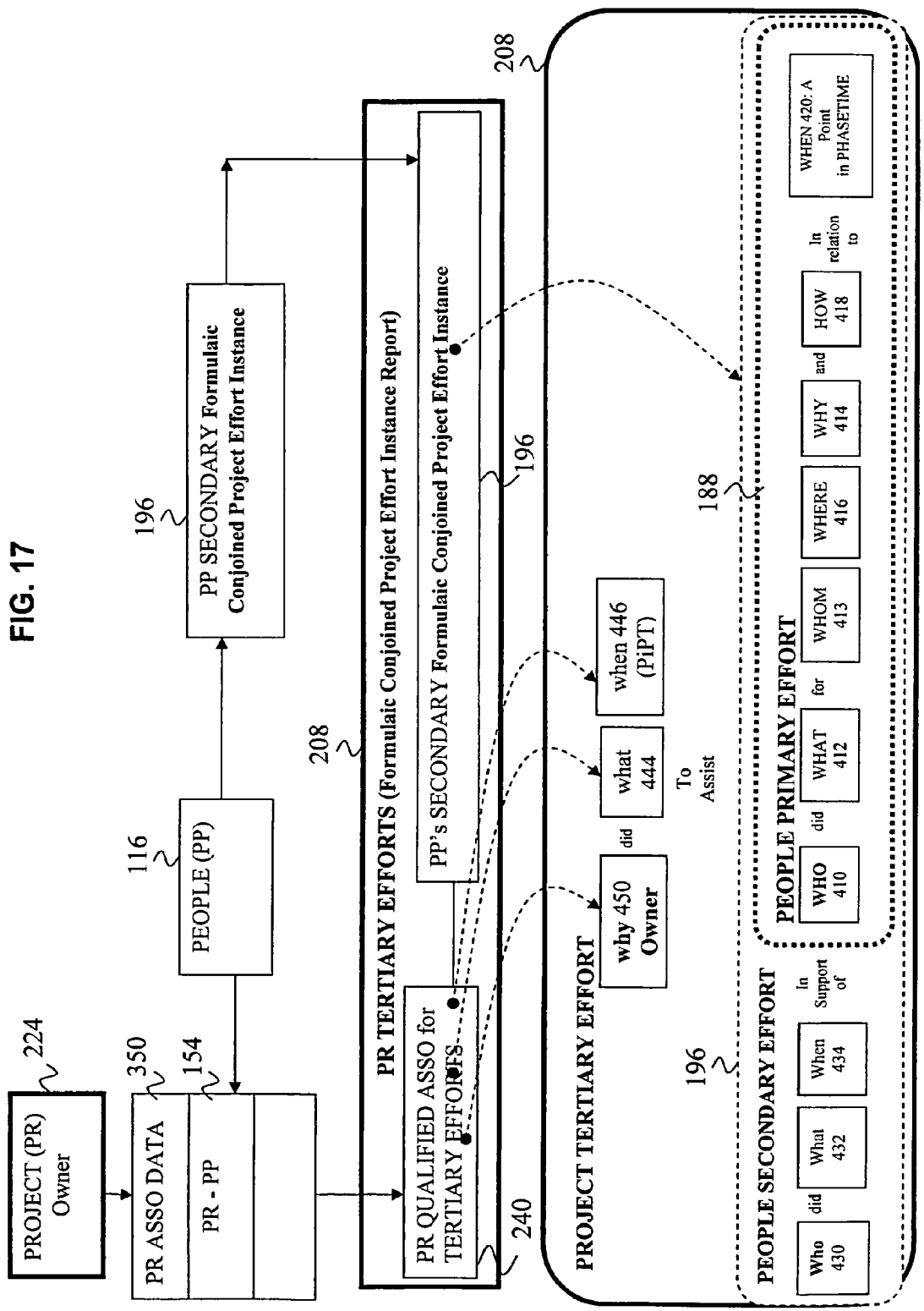
Figure 18:
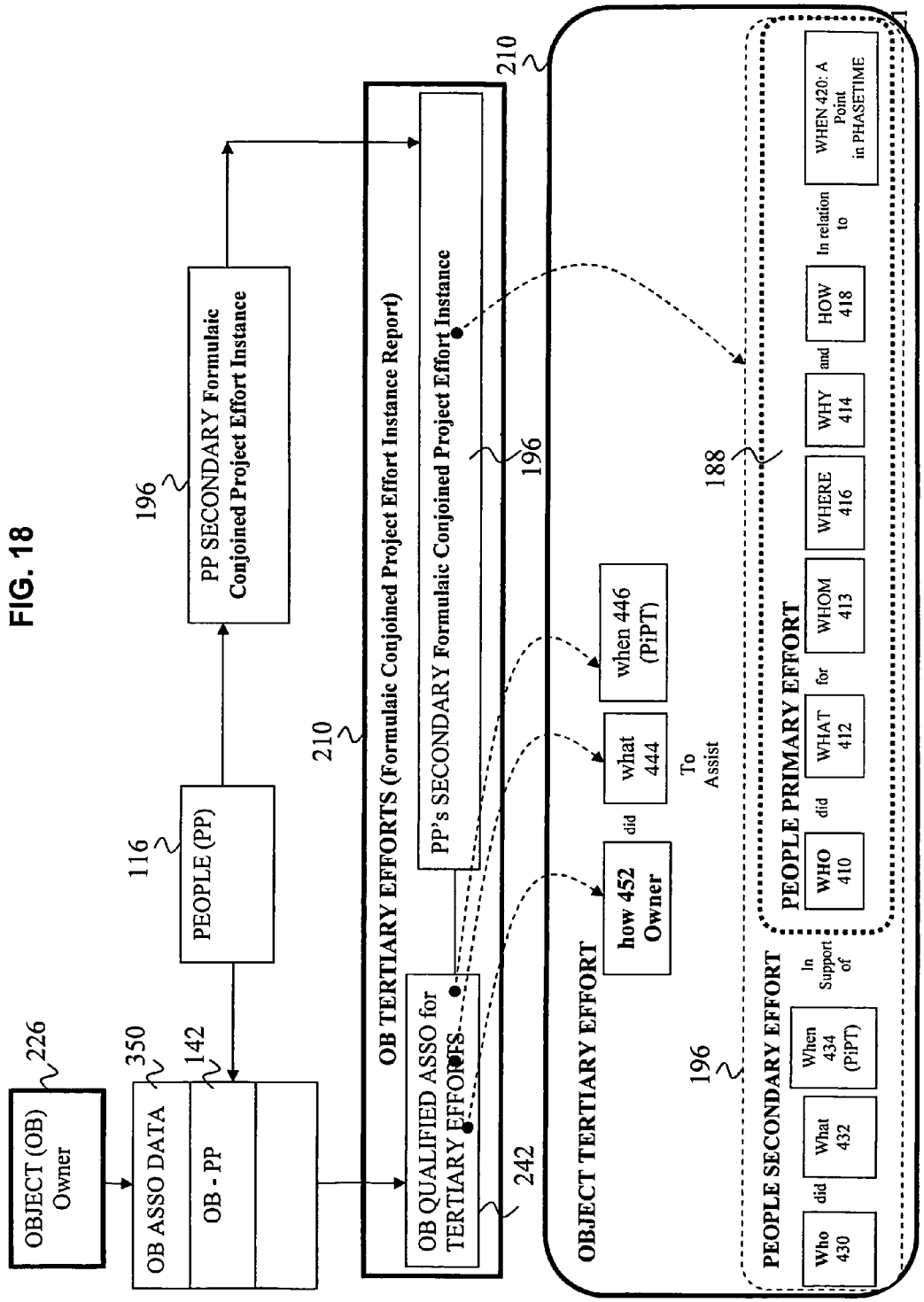
Figure 19:
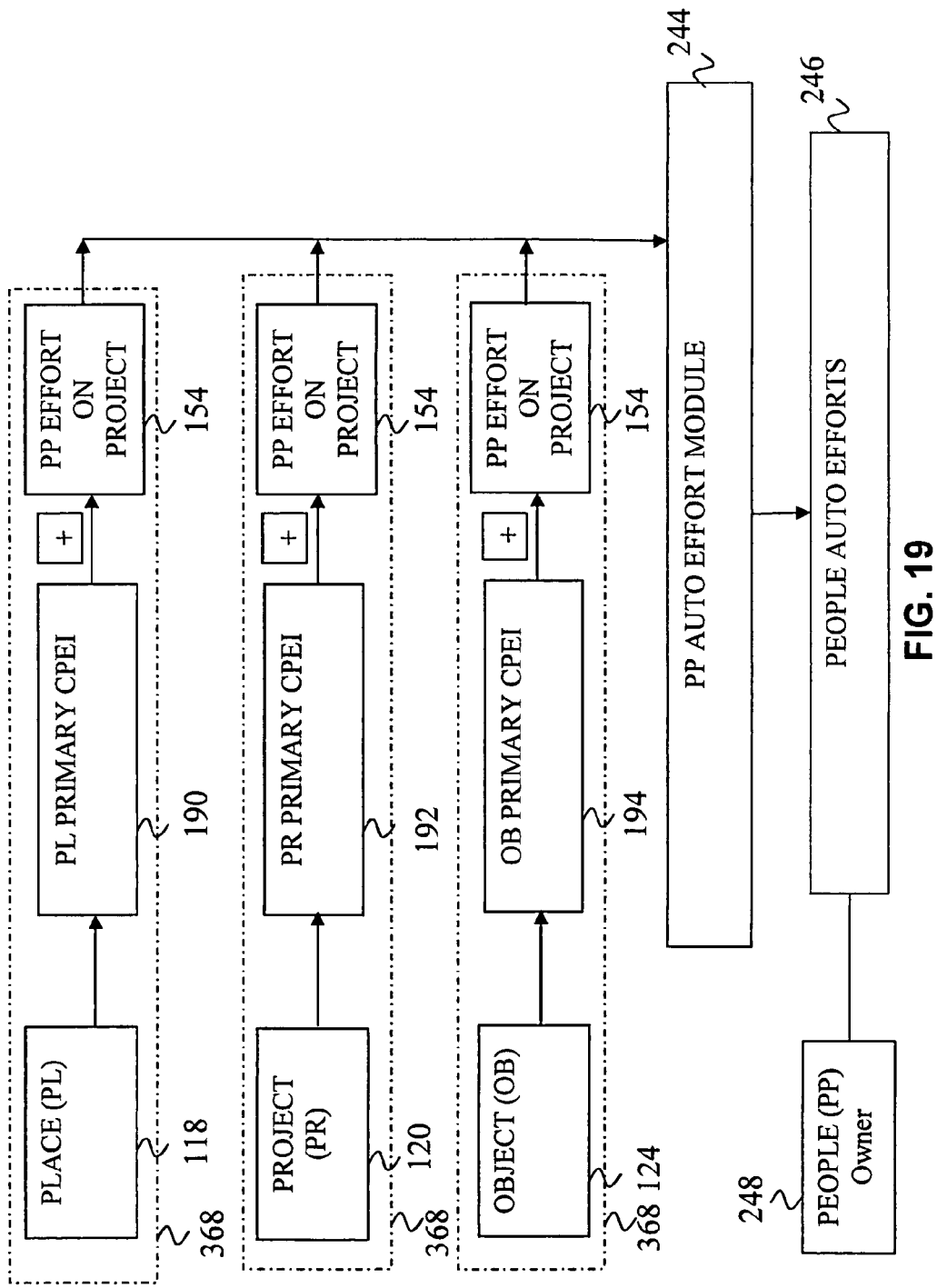
Figure 20:
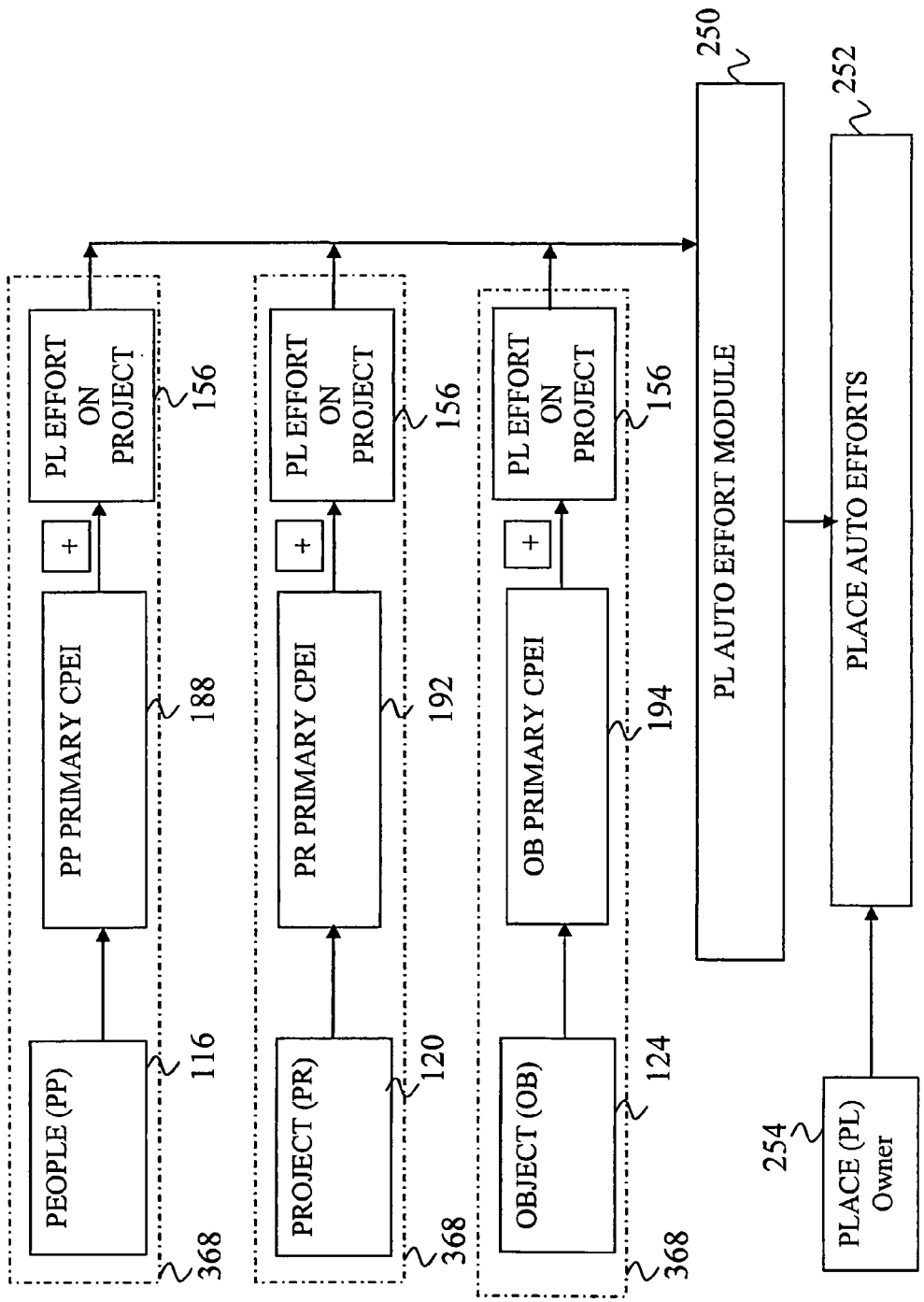
Figure 21:
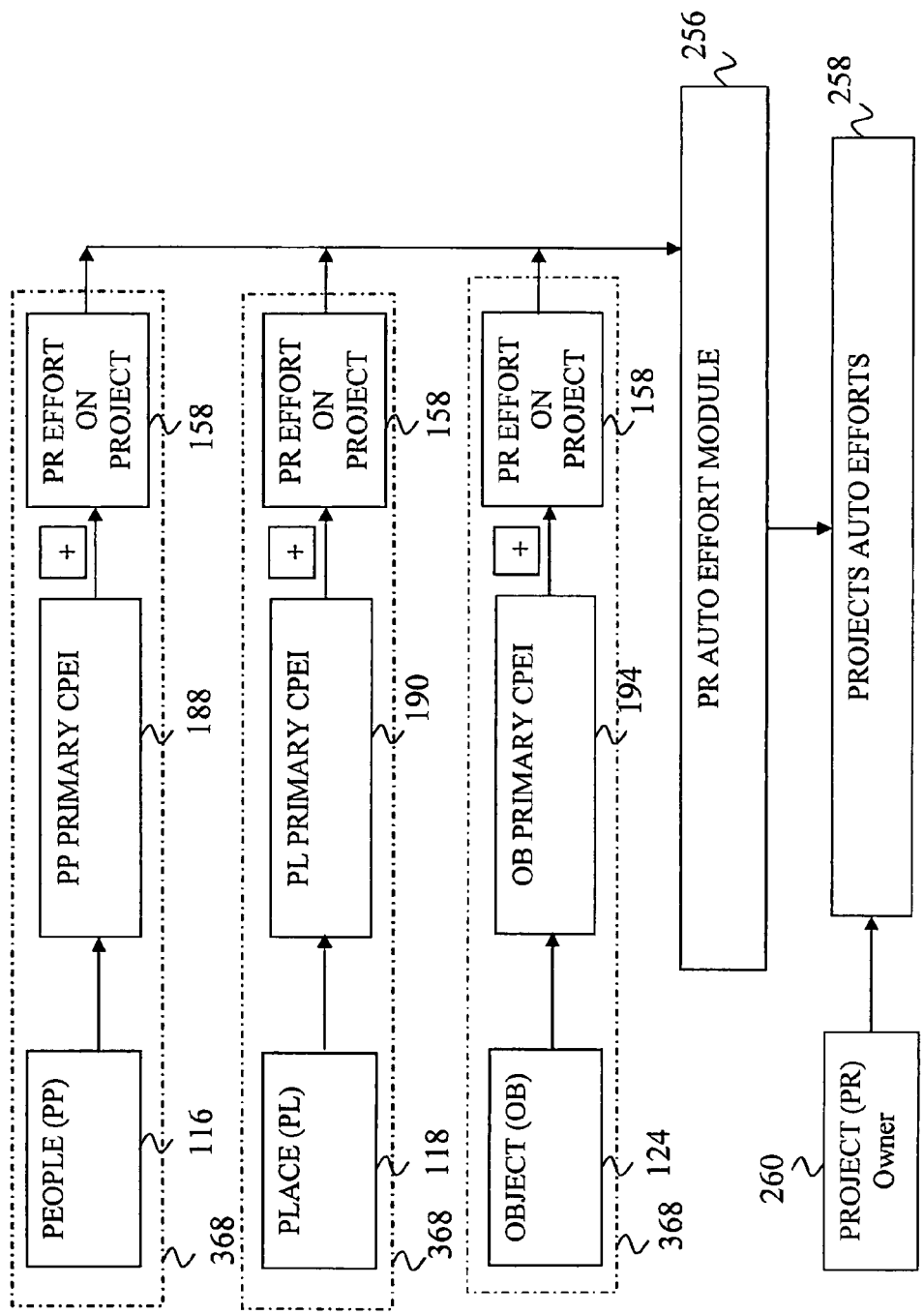
Figure 22:
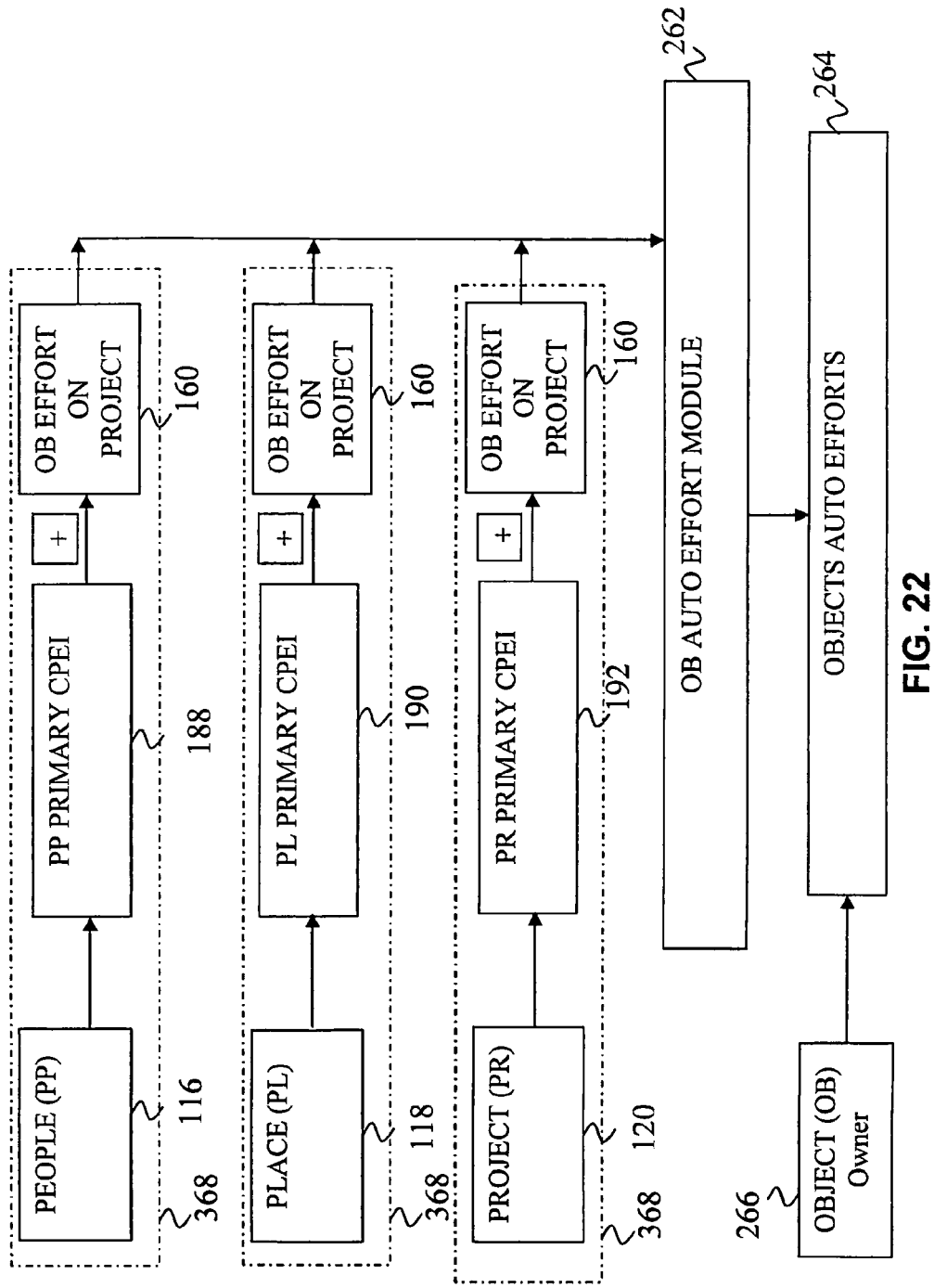
Figure 23:
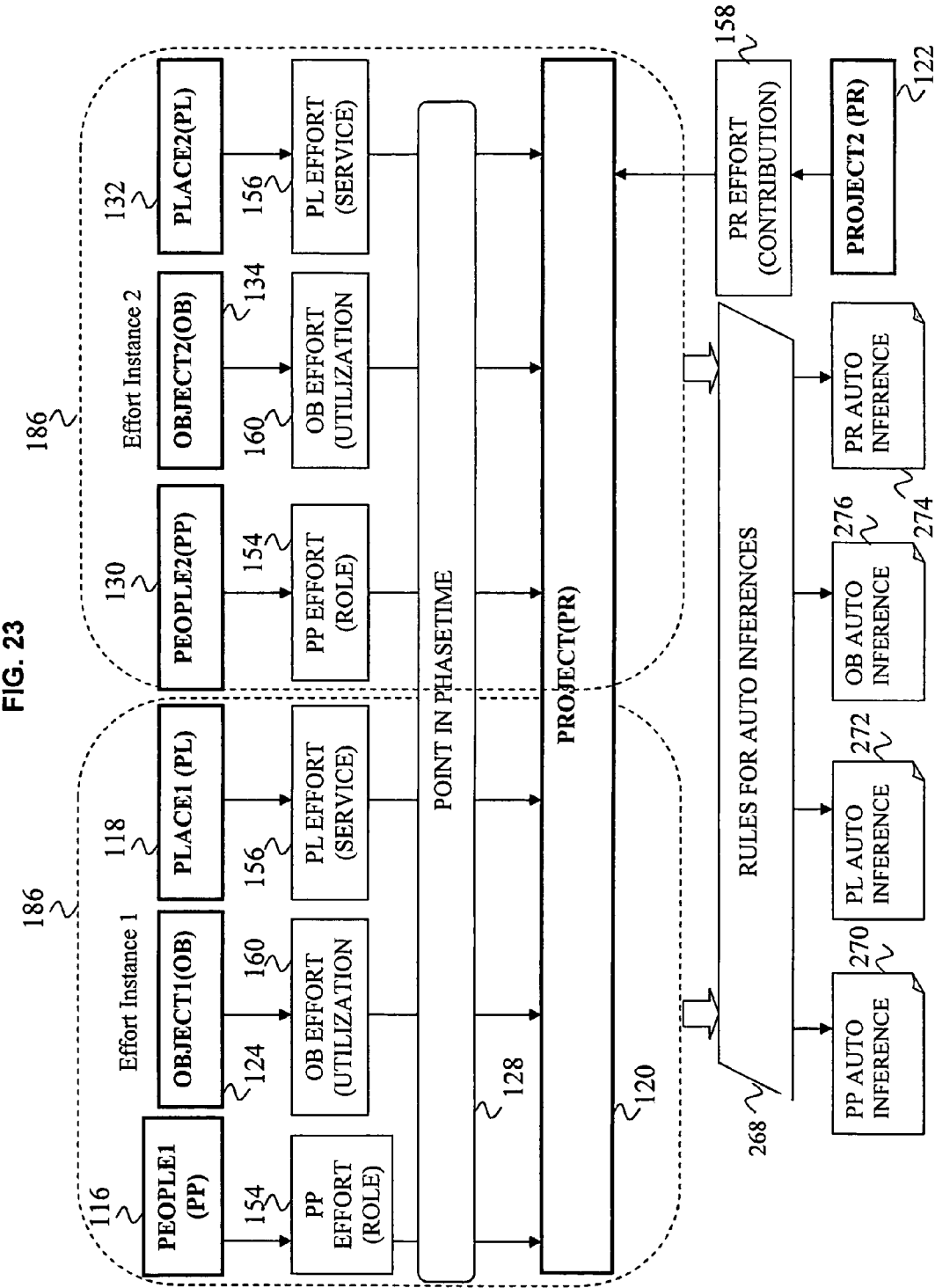
Figure 24:
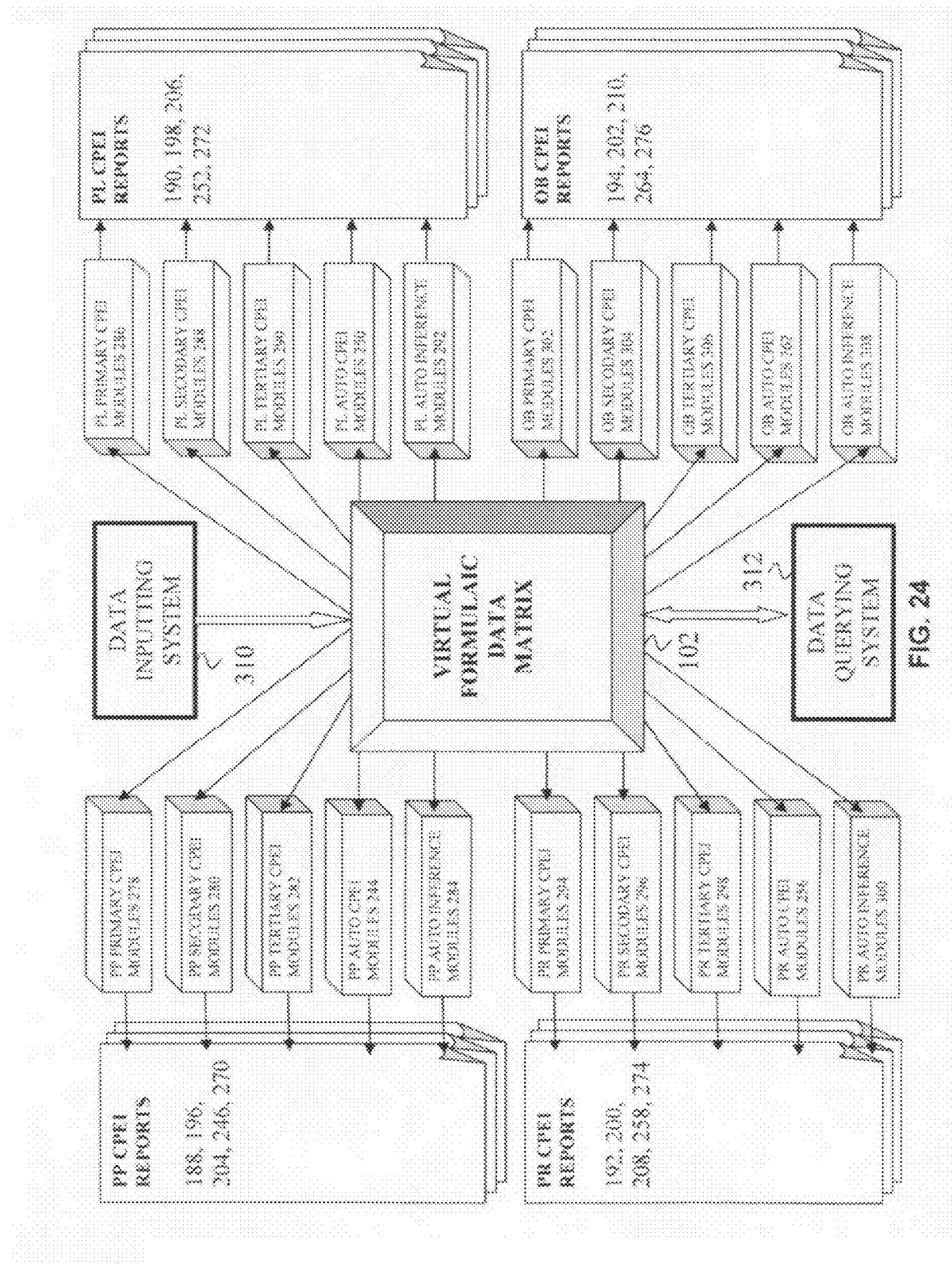
Figure 27A:
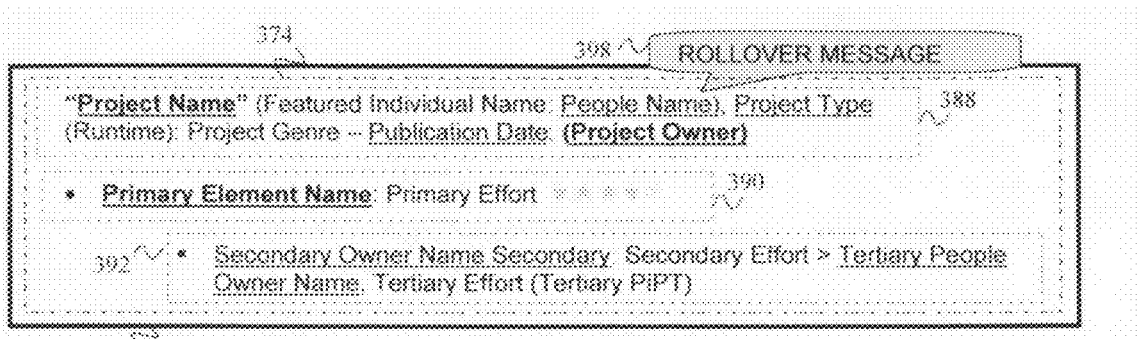
Figure 27B:
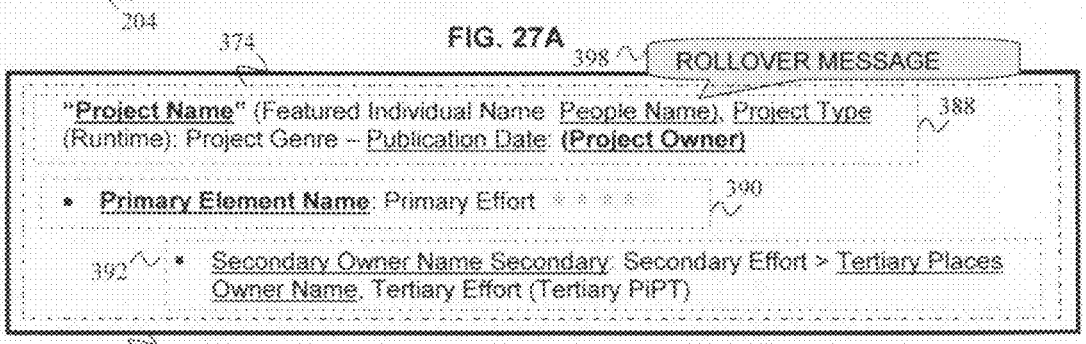
Figure 27C:
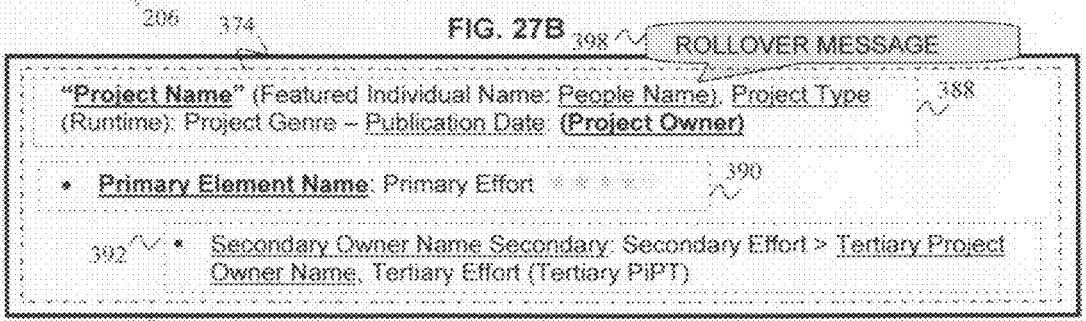
Figure 27D:
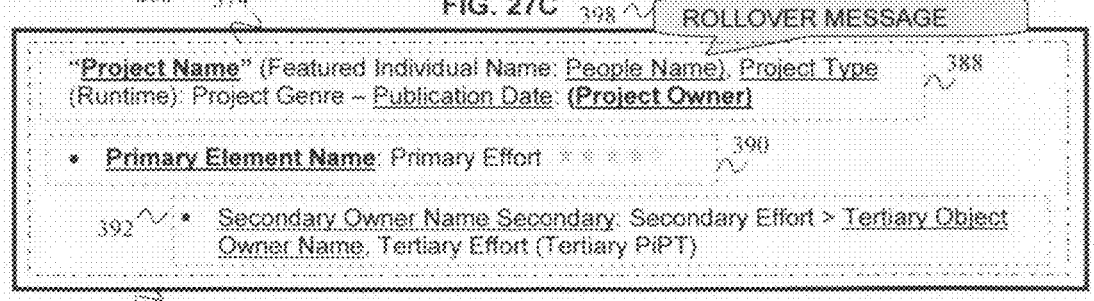

1. FIG. 1. Conjoined Project Effort Instance (CPEI) Data Logic Flow Chart
2. FIG. 2. Formulaic Element Diagram
3. FIG. 3. Formulaic Matrix Diagram
4. FIG. 4. Two Element Association Diagram
5. FIG. 5. Three Element Association Diagram
6. FIG. 6. Four Element Association Diagram
7. FIG. 7. Primary Formulaic CPEI Diagram for People
8. FIG. 8. Primary Formulaic CPEI Diagram for Places
9. FIG. 9. Primary Formulaic CPEI Diagram for Projects
10. FIG. 10. Primary Formulaic CPEI Diagram for Objects
11. FIG. 11. Secondary Formulaic CPEI Diagram for People
12. FIG. 12. Secondary Formulaic CPEI Diagram for Places
13. FIG. 13. Secondary Formulaic CPEI Diagram for Projects
14. FIG. 14. Secondary Formulaic CPEI Diagram for Objects
15. FIG. 15. Tertiary Formulaic CPEI Diagram for People
16. FIG. 16. Tertiary Formulaic CPEI Diagram for Places
17. FIG. 17. Tertiary Formulaic CPEI Diagram for Projects
18. FIG. 18. Tertiary Formulaic CPEI Diagram for Objects
19. FIG. 19. People Auto Effort Diagram
20. FIG. 20. Places Auto Effort Diagram
21. FIG. 21. Projects Auto Effort Diagram
22. FIG. 22. Objects Auto Effort Diagram
23. FIG. 23. Auto Inference Diagram
24. FIG. 24. Formulaic Matrix Reporting Modules
25. FIG. 25A. Primary CPEI Field and Appendage Diagram for People
26. FIG. 25B. Primary CPEI Field and Appendage Diagram for Places
27. FIG. 25C. Primary CPEI Field and Appendage Diagram for Projects
28. FIG. 25D. Primary CPEI Field and Appendage Diagram for Objects
29. FIG. 26A. Secondary CPEI Field and Appendage Diagram for People
30. FIG. 26B. Secondary CPEI Field and Appendage Diagram for Places
31. FIG. 26C. Secondary CPEI Field and Appendage Diagram for Projects
32. FIG. 26D. Secondary CPEI Field and Appendage Diagram for Objects
33. FIG. 27A. Tertiary CPEI Field and Appendage Diagram for People
34. FIG. 27B. Tertiary CPEI Field and Appendage Diagram for Places
35. FIG. 27C. Tertiary CPEI Field and Appendage Diagram for Projects
36. FIG. 27D. Tertiary CPEI Field and Appendage Diagram for Objects

LIST OF REFERENCE NUMERALS

100. Industry Core Database
101. Elements
102. Virtual Formulaic Data Matrix
103. Who did What for Whom Formulae 104. Data View Modules
105. Element Relational and Attribute Data (170 172 174 176 178 180 182 184)
106. CPEI Data View (Virtual Tables)
108. CPEI Data Generating Modules
110. CPEI Data Request (Querying) Modules
112. CPEI Data Searching Engine (Modules)
114. CPEI Reporting System (Modules)
115. Formula Associative Data Values
116. People (PP)
118. Places (PL)
120. Project (PR)
122. Project2 (PR2)
124. Object (OB)
126. - - -
128. Point in Phasetime (PiPT)
130. People2 (PP2)
132. Places2 (PL2)
134. Object2 (OB2)
136. People to People Association (PP-PP ASSOC)
138. People to Places Association (PP-PL ASSOC)
139. - - -
140. - - -
141. - - -
142. People to Object Association (PP-OB ASSOC)
144. Places to Places Association (PL-PL ASSOC)
146. - - -
148. Places to Object Association (PL-OB ASSOC)
150. Object to Object Association (OB-OB ASSOC)
152. People to Places to Object Association (PP-PL-OB ASSOC)
153. Effort
154. People to Project Association PP-PR (Role)
156. Places to Project Association PL-PR (Services)
158. Project to Project2 Association PR-PR (Contribution)
160. Object to Project Association OB-PR (Utilization)
162. People to Project to Object Association (PP-PR-OB ASSOC)
164. Places to Project to Object Association (PL-PR-OB ASSOC)
166. People to Project to Places Association (PP-PR-PL ASSOC)
168. People to Places to Project to Object Association (PP-PL-PR-OB ASSOC)
170. People Relational Data
172. Places Relational Data
174. Projects Relational Data
176. Objects Relational Data
178. People Attribute Data
180. Places Attribute Data
182. Project Attribute Data
184. Object Attribute Data
186. Effort Instance
188. Primary People CPEI
190. Primary Places CPEI
192. Primary Project CPEI
194. Primary Object CPEI
196. Secondary People CPEI
198. Secondary Places CPEI
200. Secondary Project CPEI
202. Secondary Object CPEI
204. Tertiary People CPEI
206. Tertiary Places CPEI
208. Tertiary Project CPEI
210. Tertiary Object CPEI
212. People Secondary Owner
214. Places Secondary Owner
216. Project Secondary Owner
218. Object Secondary Owner
220. People Tertiary Owner
222. Places Tertiary Owner
224. Projects Tertiary Owner
226. Objects Tertiary Owner
228. People Qualified Association for Secondary Efforts
229. Secondary Efforts
230. Places Qualified Association for Secondary Efforts
232. Project Qualified Association for Secondary Efforts
234. Object Qualified Association for Secondary Efforts
236. People Qualified Association for Tertiary Efforts
238. Places Qualified Association for Tertiary Efforts
240. Project Qualified Association for Tertiary Efforts
242. Object Qualified Association for Tertiary Efforts
244. People Auto Effort Module
246. People Auto CPEI Reports
248. People Auto Owner
250. Places Auto Effort Module
252. Places Auto CPEI Reports
254. Places Auto Owner
256. Project Auto Effort Module
258. Project Auto CPEI Reports
260. Project Auto Owner
262. Object Auto Effort Module
264. Object Auto CPEI Reports
266. Object Auto Owner
268. Rules for Auto Inferences
270. People Auto Inference Efforts
272. Places Auto Inference Efforts
274. Project Auto Inference Efforts
276. Object Auto Inference Efforts
278. People Primary CPEI Modules
280. People Secondary CPEI Modules
282. People Tertiary CPEI Modules
284. People Auto Inference Modules
286. Places Primary CPEI Modules
288. Places Secondary CPEI Modules
290. Places Tertiary CPEI Modules
292. Places Auto Inference Modules
294. Project Primary CPEI Modules
296. Project Secondary CPEI Modules
298. Project Tertiary CPEI Modules
300. Project Auto Inference Modules
302. Object Primary CPEI Modules
304. Object Secondary CPEI Modules
306. Object Tertiary CPEI Modules
308. Object Auto Inference Modules
310. Data Inputting System
312. Data Querying System
314. Base Tables
316. - - -
318. - - -
320. Virtual Formulaic Data Matrix Modules
322. Conjoined Project Effort Instance (CPEI) Data
324. CPEI Reporting Rules
326. Formulaic CPEI Displays
328. Query Requests
330. Formulaic Primary Data Fields
332. People's Point of View
334. Places Point of View
336. Project's Point of View
338. Object Point of View 340. Primary Elements
341. Secondary Elements
342. - - -
344. - - -
346. - - -
348. - - -
350. Tertiary Efforts
352. - - -
354. - - -
356. - - -
358. - - -
360. - - -
362. - - -
364. - - -
366. - - -
368. Reciprocating Associations
370. - - -
372. Formulaic Secondary Data Fields
374. Formulaic Tertiary Data Fields
376. Primary Main Effort Body
378. Primary Lower Appendage One
380. Primary Lower Appendage Two
382. Secondary Main Effort Body
384. Secondary Main Body Appendage One
386. Secondary Main Body Appendage Two
388. Tertiary Main Effort Body
390. Tertiary Main Body Appendage One
392. Tertiary Main Body Appendage Two
394. Primary Rollover Message
396. Secondary Rollover Message
398. Tertiary Rollover Message
400. - - -
402. - - -
410. WHO
412. WHAT
413. WHOM
414. WHY
416. WHERE
418. HOW
420. WHEN
422. WHY*
424. WHERE*
426. HOW*
428. WHAT*
430. Who
432. What
434. When
436. Where
438. Why
440. How
442. who
444. what
446. when
448. where
450. why
452. how
454. Element Effort Event Data
546. - - -
548. - - -
550. Formulae Formal Language Semantic Infrastructure, Formal Syntax, and Formal CPEI Report Display Rules (Formulaic Infrastructure and Syntax Display Rules)

DETAILED DESCRIPTION OF THE INVENTION

FIG. 1 illustrates an overview of System Data Flow as it relates to the "Formulaic Conjoined Project Effort Instance Display Method and Search System Process Thereof."

According to FIG. 1, the "Formulaic Conjoined Project Effort Instance Display Method and Search System Process Thereof." is comprised of an Industry Core Database 100, wherein said Industry Core Database 100 is further comprised of the following:
  A Base Tables 314
  A Data View Modules 104
  A CPEI Data View (Virtual Tables) 106
  A Virtual Formulaic Data Matrix Modules 320
  A CPEI Data 322 is generated from a Virtual Formulaic Data Matrix 102 portion of the Industry Core Database 100 via a CPEI Data Generating Module 108 in response to a CPEI Data Request (Querying) Module 110 request in compliance with established a CPEI Reporting Rules 324, per a Formulae Formal Language Semantic Infrastructure, Formal Syntax, and CPEI Report Display Rules 550.

In addition, a Formulaic CPEI Report 188 190 192 194 196 198 200 202 204 206 208 210 246 252 258 264 270 272 274 276 is reported via a CPEI Reporting System (Modules) 114 in response to a Query Requests 328 which are generated via CPEI Data Request (Querying) Modules 110. The CPEI Data Request (Querying) Module 110 requests are driven by a CPEI Data Searching Engine (Modules) 112.

FIG. 2 illustrates the association capabilities of an Element 101 and an Effort Instance 186 as related to the "Formulaic Effort Instance Conjoined Project Effort Display Reporting Method and System Thereof".

According to FIG. 2, the "Formulaic Effort Instance Conjoined Project Effort Display Reporting Method and System" is comprised of Elements 101 and data that are entered into the System and Method as an Element Relational and Attribute Data 105 (170 172 174 176 178 180 182 184) as well as a Point in Phasetime 128 values. Said Element 101 data is entered, stored, and reported according to a Who did What for Whom Formulae 103, FIG. 7, 8, 9, 10.

Elements 101 can include, but are not limited to:
  A People (PP) 116
  A Places (PL) 118
  A Projects (PR) 120
  An Objects (OB) 124
  A Point in Phasetime (PiPT) 128
  Element Relational and Attribute Data 105 (170 172 174 176 178 180 182 184) includes profile or biographical information, such as physical characteristics, educational information, talent and skill data, awards data, contact info, project genres, publications dates, Point in Phasetime 128 start and end dates, and other attributes of the particular Element 101.

FIG. 2 also illustrates that associations between Elements 101 are formed within the System using a Formula Associative Data Value 115. According to System rules, Elements 101 are associated to the Project (PR) 120 through the specific Formula Associative Data Value defined as the Element's 101 an Effort 153 on that Project 120. Said Effort 153 illustrates an exertion (or use of energy) expended on the Project (PR) 120 by Element 101 in the development of an end product. They include:
  People (PP) 116 Effort 153 on Project (PR) 120=A Role 154
  Places (PL) 118 Effort 153 on Project (PR) 120=A Services 156
  Project2 (PR2) 122 Effort 153 on Project (PR) 120=A Project to Project2 PR-PR (Contribution) 158
  Object (OB) 124 Effort 153 on Project (PR) 120=A Utilization 160

FIG. 3 illustrates the associative characteristics of the "Formulaic Effort Instance Conjoined Project Effort Display Reporting Method and System Thereof" as it relates to the Virtual Formulaic Data Matrix 102 used in the reporting of the Formulaic CPEI Report 188 190 192 194 196 198 200 202 204 206 208 210 246 252 258 264 270 272 274 276.

FIG. 3 establishes that the System and Method is comprised of Effort Instances 186 further comprised of Elements 101 associated to one another via their Efforts 153 on a the Project (PR) 120 at the Point in Phasetime (PiPT) 128. FIG. 3 further illustrates the function of the Point in Phasetime 128, as a virtual $5^{th}$ Element 101, and as an essential component in the association of all Elements 101 to one another.

FIG. 3 also illustrates that the following associations can be made between Elements 101 wherein said Point in Phasetime 128 value is used to represent a period of time in which the association occurs:

People to Project Association (Role) 154=The Formula Associative Data Value 115 defines "what People (PP) 116 did on the Project (PR) 120 at the given Point In Phasetime (PiPT) 128."

Places to Project Association (Service) 156=The Formula Associative Data Value 115 defines "what Places (PL) 118 did on the Project (PR) 120 at the given Point in Phasetime (PiPT) 128."

Object to Project Association (Utilization) 160=The Formula Associative Data Value 115 defines "what Object (OB) 124 did on the Project (PR) 120 at the given Point In Phasetime (PiPT) 128, A People to Places Association (PP-PL ASSOC) 138=The Formula Associative Data Value 115 ties People (PP) 116 to Places (PL) 118 at the given Point In Phasetime (PiPT) 128.

A People to Objects Association (PP-OB ASSOC) 142=The Formula Associative Data Value 115 ties People (PP) 116 to Objects (OB) 124 at the given Point In Phasetime (PiPT) 128.

A Places to Objects Association (PL-OB ASSOC) 148=The Formula Associative Data Value 115 ties Places (PL) 118 to Objects (OB) 124 at the given Point In Phasetime (PiPT) 128.

Projects to Project2 Association (Contribution) 158=The Formula Associative Data Value 115 defines "what a Project2 (PR2) 122 did on Project (PR) 120 at the given Point in Phasetime (PiPT) 128."

FIG. 4 is a diagram illustrating the two Element Associations that are stored within the Virtual Formulaic Data Matrix 102 according to the "Formulaic Effort Instance Conjoined Project Effort Display Reporting Method and System Thereof".

As illustrated in FIG. 4, the System and Method is comprised of a two Element 101 association structure. Two Element 101 association structures are used by the System to create the more complex associations used in Effort Instances 186:

A People to People Association (PP-PP ASSOC) 136—Occurs when two People 116 Elements 101 are input and stored as associated to one another. Said association is stored within the corresponding Base Table 314.

A Places to Places Association (PL-PL ASSOC) 144—Occurs when two Places 118 Elements 101 are input and stored as associated to one another. Said association is stored within the corresponding Base Table 314.

Project to Project Association (Contribution) 158—Occurs when two Project 120 Elements 101 are input and stored as associated to one another. Said association is stored within the corresponding Base Table 314.

An Object to Object Association (OB-OB ASSOC) 150—Occurs when two Object 124 Elements 101 are input and stored as associated to one another. Said association is stored within the corresponding Base Table 314.

People to Places Association (PP-PL ASSOC) 138—Occurs when the People 116 Element 101 and the Places 118 Element 101 are input and stored as associated to one another. Said association is stored within the corresponding Base Table 314.

The People to Object Association (PP-OB ASSOC) 142—Occurs when the People 116 Element and the Object 124 Element 101 are input and stored as associated to one another. Said association is stored within the corresponding Base Table 314.

The People to Project Association (Role) 154—Occurs when the People 116 Element 101 and the Project 120 Element 101 are input and stored as associated to one another. Said association is stored within the corresponding Base Table 314.

The Places to Objects Association (PL-OB ASSOC) 148—Occurs when the Places 118 Element 101 and the Object 124 Element 101 are input and stored as associated to one another. Said association is stored within the corresponding Base Table 314.

The Places to Project Association (Services) 156—Occurs when the Places 118 Element 101 and the Project 120 Element 101 are input and stored as associated to one another. Said association is stored within the corresponding Base Table 314.

FIG. 5 is a diagram illustrating all of a three Element 101 association structure that is stored within the Virtual Formulaic Data Matrix 102 according to the "Formulaic Conjoined Project Effort Instance Display Method and Search System Process Thereof."

According to FIG. 5, the System and Method is comprised of the following three Element 101 association structures that are combinations the two Element 101 association structures. The three Element 101 association structure is used by the System to create the more complex associations used in Effort Instances 186 within the Virtual Formulaic Data Matrix 102:

A People to Places to Object Association (PP-PL-OB ASSOC) 152—Occurs when a PP-OB Association 142 and the PL-OB Association 148 are combined. The PP-PL-OB Association 152 is comprised of shared Object 124 Element 101, wherein the Object 124 Element 101 was "used by" the People 116 Element 101 at the Places 118 Element 101.

A People to Project to Object Association (PP-PR-OB ASSOC) 162—Occurs when the PP-PR Association (Role) 154 and the PR-OB Association (Utilization) 160 are combined. The PP-PR-OB Association 162 is comprised of the shared Project 120 Element 101, wherein the Object 124 Element 101 was "used by" the People 116 Element 101 on the Project 120 Element 101.

A Places to Project to Object Association (PL-PR-OB ASSOC) 164—Occurs when the PL-PR Association (Services) 156 and the PR-OB Association (Utilization) 160 are combined. The PL-PR-OB Association 164 is comprised of the shared Project 120 Element 101, wherein said Object 124 Element 101 was used at the Places 118 Element 101 on the Project 120 Element 101.

A People to Project to Places Association (PP-PR-PL ASSOC) 166—Occurs when a PP-PR Association (Role) 154 and the PL-PR Association (Services) 156 are combined. The PP-PR-PL Association 166 is comprised of the shared Project 120 Element 101, wherein said People 116 Element 101 performed the Effort 153 on the Project 120 Element 101 at the Places 118 Element 101.

FIG. 5 also illustrates that the three Element 101 association structure is comprised of Elements 101 tied together by Formulaic Associative Data Values 115 stored within the Virtual Formulaic Data Matrix 102.

FIG. 6 illustrates a four Element 101 association structure that is stored within the Virtual Formulaic Data Matrix 102 according to the "Formulaic Conjoined Project Effort Instance Display Method and Search System Process Thereof."

According to FIG. 6, the System and Method is comprised of the following four Element 101 association structures that combine the three Element 101 association structure defined in FIG. 4. When tied with the Point in Phasetime (PiPT) 128 value, the four Element 101 association structures become Effort Instances 186 within the Virtual Formulaic Data Matrix 102:

A People to Places to Project to Objects Association (PP-PL-PR-OB ASSOC) 168—Occurs when the PP-PR-OB Association 162, PP-PR-PL Association 166, PL-PR-OB Association 164, and a PP-PL-OB Association 152 are combined, wherein the new association is based on the shared Project 120 Element 101, and wherein the People 116 Element 101 used the Object 124 Element 101 at the Places 118 Element 101 on the Project 120 Element 101. All of the Elements 101 used in the four Element 101 association structures are tied together by Formula Associative Data Values 115 stored within the Virtual Formulaic Data Matrix 102.

FIG. 7 is a diagram illustrating how Effort Instances 186 are created from the combination of four Element 101 association structures that are tied together by the Point in Phasetime (PiPT) 128, wherein said Effort Instances 186 are used to generate a Primary People CPEI 188 Report from established CPEI Reporting Rules 324, and wherein said Primary People CPEI 188 Reports contain a "Formulaic Primary Data Fields 330. Specifically, FIG. 7 builds on FIGS. 4-6 by defining how People CPEI 188 Reports are generated from the Effort Instance 186 that are comprised of the following Element 101 associations tied together by the Point In Phasetime (PiPT) 128:

People Associations:
        People to People (PP-PP) 136
        People to Places (PP-PL) 138
        People to Objects (PP-OB) 142
        People to Projects (Role) 154
    Places Associations
        Places to Places (PL-PL) 144
        Places to Objects (PL-OB) 148
        Places to Projects (Services) 156
    Objects Associations
        Objects to Objects (OB-OB) 150
        Objects to Projects (Utilization) 160

According to FIG. 7, the Effort Instance 186 can be generated from a People's Point of View 332 when the People 116 Element 101 (owner) has the Effort 153 on the Project 120 at the given Point in Phasetime (PiPT) 128. Said Effort 153 is the People to Project Association PP-PR (Role) 154 which illustrates an exertion (or use of energy) expended on the Project 120 by the People 116 in the development of a product.

FIG. 7 also establishes Effort Instances 186 are comprised of associated datasets of interrelated Element 101 data which is associated together by Efforts 153 on the common Project 120 at the given Point in Phasetime (PiPT) 128.

According to FIG. 7, the Primary People CPEI 188 Report is derived and reported from said Effort Instance 186 within the Virtual Formulaic Data Matrix 102 according to established CPEI Reporting Rules 324 for People 116. Said CPEI Reporting Rules 324 for People 116 establish Primary People CPEI 188 Reports will report:

a WHO 410—People 116 (owner)
    did a WHAT 412—(Role) 154
    for a WHOM 413—Project 120 owner
    a WHERE 416—Places 118
    a WHY 414—Project 120
    and a HOW 418—Objects 124
    in relation to a WHEN 420—Point in Phasetime (PiPT) 128

It should be recognized that the Effort Instances 186 are reported dynamically from the System which builds the Primary People CPEI 188 Report one data field at a time. The data used to populate the CPEI is extracted from Element 101 associations and Element Relational and Attribute Data 105, which Element Relational and Attribute Data 105 may include a People Relational Data 170, a Places Relational Data 172, a Projects Relational Data 174, an Objects Relational Data 176, a People Attribute Data 178, a Places Attribute Data 180, a Projects Attribute Data 182 and an Object Attribute Data 184.

FIG. 8 is a diagram illustrating how Effort Instances 186 are created four Element 101 association structures that are tied together by the Point in Phasetime (PiPT) 128, wherein said Effort Instances 186 are used to generate a Primary Places CPEI 190 Report from established CPEI Reporting Rules 324, and wherein said Primary Places CPEI 190 Reports contain "Formulaic Primary Data Fields 330.

Specifically, FIG. 8 builds on FIGS. 4-6 by defining how Primary Places CPEI 190 Displays are generated from Effort Instances 186 which are comprised of the following Element 101 associations tied together by the Point in Phasetime (PiPT) 128:

People Associations:
        People to People (PP-PP) 136
        People to Places (PP-PL) 138
        People to Objects (PP-OB) 142
        People to Projects (Role) 154
    Places Associations
        Places to Places (PL-PL) 144
        Places to Objects (PL-OB) 148
        Places to Projects (Services) 156
    Objects Associations
        Objects to Objects (OB-OB) 150
        Objects to Projects (Utilization) 160

According to FIG. 8, said Effort Instance 186 can be generated from a Places Point of View 334 when the Places 118 Element 101 (owner) has the Effort 153 on the Project 120 at the given Point in Phasetime 128. Said Effort 153 is the Services 156 which illustrates an exertion (or use of energy) expended on the Project 120 by the Places 118 in the development of a product.

FIG. 8 also establishes Effort Instances 186 are comprised of associated datasets of interrelated Element 101 data which is associated together by Efforts 153 on the common Project 120 at the given Point in Phasetime 128.

According to FIG. 8, a Place's Primary CPEI 190 Report is derived and reported from said Effort Instance 186 within the Virtual Formulaic Data Matrix 102 according to established CPEI Reporting Rules 324 for Places 118. Said CPEI Reporting Rules 324 for Places 118 establish that Primary Places CPEI 190 Reports will report:

WHERE 416—Places 118 (owner)
  did WHAT 412—Place's 118 owner Effort 153 (Services) 156
WHO 410—People 116
did a WHAT* 428—People 116 Effort 153 (Role) 154
for WHOM 413—Project 120 owner
a WHERE* 424—A Places2 132
WHY 414—Project 120
and HOW 418—Objects 124
in relation to the WHEN 420—Point in Phasetime (PiPT) 128

It should be recognized that the Effort Instances 186 reported dynamically from the System which builds the Primary Places CPEI 190 Report one data field at a time. The data used to populate the CPEI is extracted from Element 101 associations and Element Relational and Attribute Data 105 (170 172 174 176 178 180 182 184).

FIG. 9 is a diagram illustrating how Effort Instances 186 are created from four Element 101 association structures that are tied together by the Point in Phasetime (PiPT) 128, wherein said Effort Instances 186 are used to generate a Primary Project CPEI 192 Report from established CPEI Reporting Rules 324, and wherein said Primary Project CPEI 192 Reports contain "Formulaic Primary Data Fields 330.

Specifically, FIG. 9 builds on FIGS. 4-6 by defining how Primary Project CPEI 192 Reports are generated from Effort Instances 186 which are comprised of the following Element 101 associations tied together by the Point in Phasetime (PiPT) 128:
  People Associations:
    People to People (PP-PP) 136
    People to Places (PP-PL) 138
    People to Objects (PP-OB) 142
    People to Projects (Role) 154
  Places Associations
    Places to Places (PL-PL) 144
    Places to Objects (PL-OB) 148
    Places to Projects (Services) 156
  Objects Associations
    Objects to Objects (OB-OB) 150
    Objects to Projects (Utilization) 160

According to FIG. 9, the Effort Instance 186 can be generated from a Projects Point of View 336 when the Project 120 Element 101 (owner) has the Effort 153 on another Project2 122 at the given Point in Phasetime (PiPT) 128. Said Effort 153 is the Contribution 158 which illustrates an exertion (or use of energy) expended on the Project2 122 by the Project 120 (owner) in the development of a product.

FIG. 9 also establishes Effort Instances 186 are comprised of associated datasets of interrelated Element 101 data which is associated together by Efforts 153 on the common Project 120 at the given Point in Phasetime (PiPT) 128.

According to FIG. 9, the Primary Project CPEI 192 Report is derived and reported from said Effort Instance 186 within the Virtual Formulaic Data Matrix 102 according to established CPEI Reporting Rules 324 for Projects 120. Said CPEI Reporting Rules 324 for Projects 120 establish that Primary Places CPEI 190 Reports will report:
  WHY 414—Project 120 (owner)
    did WHAT 412—Project 120 owner Effort 153 (Contribution) 158
  WHO 410—People 116
  did WHAT* 428—People 116 Effort 153 (Role) 154
  for WHOM 413—Project2 122 owner
  WHERE 416—Places 118
  a WHY* 422—Project2 122
  and HOW 418—Objects 124
  in relation to the WHEN 420—Point in Phasetime (PiPT) 128

It should be recognized that the Effort Instances 186 reported dynamically from the System which builds the Primary Project CPEI 192 Report one data field at a time. The data used to populate the CPEI is extracted from Element 101 associations and Element Relational and Attribute Data 105 (170 172 174 176 178 180 182 184).

FIG. 10 is a diagram illustrating how Effort Instances 186 are created from four Element 101 association structures that are tied together by the Point in Phasetime (PiPT) 128, wherein said Effort Instances 186 are used to generate a Primary Object CPEI 194 Report from established CPEI Reporting Rules 324, and wherein said Primary Object CPEI 194 Reports contain "Formulaic Primary Data Fields 330.

Specifically, FIG. 10 builds on FIGS. 4-6 by defining how Primary Object CPEI 194 Reports are generated from Effort Instances 186 which are comprised of the following Element 101 associations tied together by the Point in Phasetime (PiPT) 128:
  People Associations:
    People to People (PP-PP) 136
    People to Places (PP-PL) 138
    People to Objects (PP-OB) 142
    People to Projects (Role) 154
  Places Associations
    Places to Places (PL-PL) 144
    Places to Objects (PL-OB) 148
    Places to Projects (Services) 156
  Objects Associations
    Objects to Objects (OB-OB) 150
    Objects to Projects (Utilization) 160

According to FIG. 10, said Effort Instance 186 can be generated from an Object Point of View 338 when the Object 124 Element 101 (owner) has the Effort 153 on the Project 120 at the given Point in Phasetime (PiPT) 128. Said Effort 153 is the Utilization 160 which illustrates an exertion (or use of energy) expended on the Project 120 by the Object 124 in the development of a product.

FIG. 10 also establishes Effort Instances 186 are comprised of associated datasets of interrelated Element 101 data which is associated together by Efforts 153 on the common Project 120 at the given Point in Phasetime (PiPT) 128.

According to FIG. 10, a Primary Object CPEI 194 Report is derived and reported from said Effort Instance 186 within the Virtual Formulaic Data Matrix 102 according to established CPEI Reporting Rules 324 for Objects 124. Said CPEI Reporting Rules 324 for Objects 124 establish that Primary Objects CPEI 194 Reports will report:
  HOW 418—Object 124 (owner)
    did WHAT 412—Object 124 owner's Effort 153 (Utilization) 160
  WHO 410—People 116
  did WHAT* 428—People 116 Effort 153 (Role) 154
  for WHOM—413—Project 120 owner
  WHERE 416—Places 118
  WHY 414—Project 120
  and HOW* 426—An Object2 134
  in relation to the WHEN 420—Point in Phasetime (PiPT) 128

It should be recognized that the Effort Instances 186 reported dynamically from the System which builds the Primary Project CPEI 192 Report one data field at a time. The data used to populate the CPEI is extracted from Element 101 associations and Element Relational and Attribute Data 105 (170 172 174 176 178 180 182 184).

FIG. 11 is a diagram illustrating how a Secondary People CPEI 196 Report is generated through a People Qualified Association for Secondary Efforts 228 with the Primary People 116 Element 101 with the Primary People CPEI 188.

FIG. 11 builds on FIG. 7 by defining that a People Secondary Owner 212 is associated to the Primary People 116 by a People to People Association (PP-PP ASSOC) 136 which is stored in the Virtual Formulaic Data Matrix 102.

A People Secondary Owner 212 Element 101 may be awarded a Secondary People CPEI 196 when the People Secondary Owner 212 has the People Qualified Association for Secondary Efforts 228 to the Primary People 116, wherein the Primary People 116 has been awarded the Primary People CPEI 188, and wherein the People Secondary Owner's 212 People Qualified Association for Secondary Efforts 228 contributed to the Primary People 116 in achieving their Primary People CPEI 188.

FIG. 11 also establishes that the above People Qualified Association for Secondary Efforts 228 is considered a Secondary Efforts 229, wherein said Secondary Efforts 229 is the Formula Associative Data Value 115 that is stored in the Base Tables 314.

According to FIG. 11, the Secondary People CPEI 196 Report is derived and reported from an Association between the People Secondary Owner 212 Element 101 and the Primary People 116 Element 101, wherein the Effort Instance 186 that stores the Primary People CPEI 188 is updated with the People Qualified Association for Secondary Efforts 228 that ties the People Secondary Owner 212 to the Primary People 116.

FIG. 11 also establishes that Secondary People CPEI 196 Reports are reported from the Virtual Formulaic Data Matrix 102 according to CPEI Reporting Rules 324 for Secondary People CPEI 196 including:
- a Who 430 ($2^{nd}$)—People Secondary Owner 212
- did a What 432 ($2^{nd}$)—People Qualified Association 228 (Secondary Effort 229)
- a When 434 ($2^{nd}$)—Point In Phasetime (PiPT) 128 for Secondary Effort 229
- in Support of
- WHO 410—Primary People 116 (owner of Primary People CPEI 188)
- did WHAT 412—Effort 153 (Role) 154
- for WHOM 413—Primary Project 120 owner
- WHERE 416—Primary Places 118
- WHY 414—Primary Project 120
- and HOW 418—Primary Objects 124
- in relation to the WHEN 420—Point in Phasetime (PiPT) 128

FIG. 11 also acknowledges that the System and Method is comprised of rules for approving the People Qualified Associations for Secondary Efforts 228 used in Secondary People CPEIs 196:
- In order to create the Secondary People CPEI 196, the Primary People CPEI 188 MUST first exist.
- The Primary People 116 Element 101 will have to approve the People Qualified Association for Secondary Efforts 228 between it and the People Secondary Owner 212.
- The Secondary Effort 229 can be established when it receives the approval the People Qualified Association for Secondary Efforts 228 to the Primary People 116 Element 101
- The owner of the Project 120 which is the subject of the Primary People CPEI 188 can disapprove the Secondary Effort 229.
- The People Secondary Owner 212 must provide some type of proof (such as a document or data) that affirms their People Qualified Association for Secondary Effort 228 to the Primary People 116 Element 101

FIG. 12 is a diagram illustrating how a Secondary Places CPEI 198 Report is generated through a Places Qualified Association for Secondary Efforts 230 with the Primary People 116 Element 101 with the Primary People CPEI 188.

FIG. 12 builds on FIG. 8 by defining that a Places Secondary Owner 214 Element 101 is associated to the Primary People 116 Element by the People to Places Association (PP-PL ASSOC) 138 which is stored in the Virtual Formulaic Data Matrix 102.

A Places Secondary Owner 214 Element 101 may be awarded a Secondary Places CPEI 198 when the Places Secondary Owner 214 has the Places Qualified Association to Secondary Effort 230 to the Primary People 116, wherein the Primary People 116 has been awarded the Primary People CPEI 188, and wherein the Places Secondary Owner's 214 Places Qualified Association for Secondary Efforts 230 contributed to the Primary People 116 in achieving their Primary People CPEI 188.

FIG. 12 also establishes that the above Places Qualified Association to Secondary Effort 230 is considered Secondary Efforts 229, wherein said Secondary Effort 229 is the Formula Associative Data Value 115 that is stored in the Base Tables 314.

According to FIG. 12, a Secondary Places CPEI 198 Report is derived and reported from an association between the Places Secondary Owner 214 Element 101 and the Primary People 116 Element 101, wherein the Effort Instance 186 that stores the Primary People CPEI 188 is updated with the Places Qualified Association for Secondary Effort 230 that ties the Places Secondary Owner 214 to the Primary People 116.

FIG. 12 also establishes that Secondary Places CPEI 198 Reports are reported from the Virtual Formulaic Data Matrix 102 according to CPEI Reporting Rules 324 for Secondary Places CPEI 198 including:
- a Where 436 ($2^{nd}$)—Places Secondary Owner 214
- did What 432 ($2^{nd}$)—Places Qualified Association 230 (Secondary Effort 229)
- When 434 ($2^{nd}$)—Point In Phasetime (PiPT) 128 for the Secondary Effort 229
- in Support of
- WHO 410—Primary People 116 (owner of Primary People CPEI 188)
- did WHAT 412—Effort 153 (Role) 154
- for WHOM 413—Primary Project 120 owner
- WHERE 416—Primary Places 118
- WHY 414—Primary Project 120
- and HOW 418—Primary Objects 124
- in relation to the WHEN 420—Point in Phasetime (PiPT) 128

FIG. 12 also acknowledges that the System and Method is comprised of rules for approving the Places Qualified Associations 230 used in Secondary Places CPEIs 198:
- In order to create a Secondary Places CPEI 198, the Primary People CPEI 188 MUST first exist.
- The Primary People 116 Element 101 will have to approve the Places Qualified Association for Secondary Effort 230 between it and the Places Secondary Owner 214.
- The Secondary Effort 229 can be established when it receives the approval for the Places Qualified Association for Secondary Effort 230 to the Primary People 116 Element 101
- The owner of the Project 120 which is the subject of the Primary People CPEI 188 can disapprove the Secondary Effort 229.

The Places Secondary Owner 214 must provide some type of proof (such as a document or data) that affirms their Places Qualified Association for Secondary Effort 230 to the Primary People 116 Element 101

FIG. 13 is a diagram illustrating how a Secondary Project CPEI 200 Report is generated through a Project Qualified Associations for Secondary Effort 232 with the Primary Project 120 Element 101 with a Primary Project CPEI 192.

FIG. 13 builds on FIG. 9 by defining that a Project Secondary Owner 216 Element 101 is associated to a Primary Project 120 Element by a Project to Project Association (Contribution) 158 which is stored in the Virtual Formulaic Data Matrix 102.

A Project Secondary Owner 216 Element 101 may be awarded the Secondary Project CPEI 200 when the Project Secondary Owner 216 has the Project Qualified Association for Secondary Effort 232 to a Primary Project 120, wherein the Primary Project 120 has been awarded a Primary Project CPEI 192, and wherein the Project Secondary Owner's 216 Project Qualified Association for Secondary Effort 232 contributed to the Primary Project 120 in achieving their Primary Project CPEI 192.

FIG. 13 also establishes that the above Project Qualified Association for Secondary Effort 232 is considered Secondary Efforts 229, wherein said Secondary Effort 229 is the Formula Associative Data Value 115 that is stored in the Base Tables 314.

According to FIG. 13, the Secondary Project CPEI 200 Report is derived and reported from an association between the Project Secondary Owner 216 Element 101 and the Primary Project 120 Element 101, wherein the Effort Instance 186 that stores the Primary Project CPEI 192 is updated with the Project Qualified Association for Secondary Effort 232 that ties the Project Secondary Owner 216 to the Primary Project 120.

FIG. 13 also establishes that Secondary Project CPEI 200 Reports are reported from the Virtual Formulaic Data Matrix 102 according to CPEI Reporting Rules 324 for Secondary Project CPEI 200 including:

a Why 438 ($2^{nd}$)—Project Secondary Owner 216
did What 432 ($2^{nd}$)—Project Qualified Association 232 (Secondary Effort 229)
When 434 ($2^{nd}$)—Point In Phasetime (PiPT) 128 for the Secondary Effort 229
in Support of
WHO 410—Primary People 116 (owner of Primary People CPEI 188)
did WHAT 412—Effort 153 (Role) 154
for WHOM 413—Primary Project 120 owner
WHERE 416—Primary Places 118
WHY 414—Primary Project 120
and HOW 418—Primary Objects 124
in relation to the WHEN 420—Point in Phasetime (PiPT) 128

FIG. 13 also acknowledges that the System and Method is comprised of rules for approving the Project Qualified Associations for Secondary Efforts 232 used in Secondary Project CPEIs 200:

In order to create a Secondary Projects CPEI 200, a Primary Project CPEI 192 must first exist.
The Primary Project 120 Element 101 will have to approve the Project Qualified Association for Secondary Effort 232 between it and the Project Secondary Owner 216.
The Secondary Effort 229 can be established when it receives the approval of the Project Qualified Association for Secondary Effort 232 to the Primary Project 120 Element 101

The owner of the Primary Project 120 which is the subject of the Primary Project CPEI 192 can disapprove the Secondary Effort 229.
The Project Secondary Owner 216 must provide some type of proof (such as a document or data) that affirms their Project Qualified Association for Secondary Effort 232 to the Primary Project 120 Element 101

FIG. 14 is a diagram illustrating how a Secondary Object CPEI 202 Report is generated through an Object Qualified Associations for Secondary Effort 234 with the Primary People 116 Element 101 with the Primary People CPEI 188.

FIG. 14 builds on FIG. 10 by defining an Object Secondary Owner 218 Element 101 is associated to the Primary People 116 Element by a People to Object Association (PP-OB ASSOC) 142 which is stored in the Virtual Formulaic Data Matrix 102.

The Object Secondary Owner 218 Element 101 may be awarded the Secondary Object CPEI 202 when the Object Secondary Owner 218 has the Object Qualified Association for Secondary Effort 234 to the Primary People 116, wherein the Primary People 116 has been awarded the Primary People CPEI 188, and wherein the Object Secondary Owner's 218 Object Qualified Association for Secondary Effort 234 contributed to the Primary People 116 in achieving their Primary People CPEI 188.

FIG. 14 also establishes that the above Object Qualified Association for Secondary Effort 234 is considered Secondary Efforts 229, wherein said Secondary Effort 229 is the Formula Associative Data Value 115 that is stored in the Base Tables 314.

According to FIG. 14, the Secondary Object CPEI 202 Report is derived and reported from an association between the Object Secondary Owner 218 Element 101 and the Primary People 116 Element 101, wherein the Effort Instance 186 that stores the Primary People CPEI 188 is updated with the Object Qualified Association for Secondary Effort 234 that ties the Object Secondary Owner 218 to the Primary People 116.

FIG. 14 also establishes that Secondary Object CPEI 202 Reports are reported from the Virtual Formulaic Data Matrix 102 according to CPEI Reporting Rules 324 for Secondary Objects CPEI 202 including:

a HOW 440 ($2^{nd}$)—Object Secondary Owner 218
did What 432 ($2^{nd}$)—Object Qualified Association 234 (Secondary Effort 229)
When 434 ($2^{nd}$)—Point In Phasetime (PiPT) 128 for the Secondary Effort 229
in Support of
WHO 410—Primary People 116 (owner of Primary People CPEI 188)
did WHAT 412—Effort 153 (Role) 154
for WHOM 413—Primary Project 120 owner
WHERE 416—Primary Places 118
WHY 414—Primary Project 120
and HOW 418—Primary Objects 124
in relation to the WHEN 420—Point in Phasetime (PiPT) 128

FIG. 14 also acknowledges that the System and Method is comprised of rules for approving the Object Qualified Associations for Secondary Efforts 234 used in Secondary Object CPEIs 202:

In order to create the Secondary Object CPEI 202, the Primary People CPEI 188 must first exist.
The Primary People 116 Element 101 will have to approve the Object Qualified Association for Secondary Effort 234 between it and the Object Secondary Owner 218.

The Secondary Effort 229 can be established when it receives the approval of the Object Qualified Association for Secondary Effort 234 to the Primary People 116 Element 101

The owner of the Project 120 which is the subject of the Primary People CPEI 188 can disapprove the Secondary Effort 229.

The Object Secondary Owner 218 must provide some type of proof (such as a document or data) that affirms their Object Qualified Association for Secondary Effort 234 to the Primary People 116 Element 101

FIG. 15 is a diagram illustrating how a Tertiary People CPEI 204 Report is derived and reported for a People Tertiary Owner 220 Element 101 through a People Qualified Association for Tertiary Effort 236 with the People Secondary Owner 212 Element 101, wherein said People Secondary Owner 212 has the Secondary People CPEI 196 derived through the Places Qualified Associations for Secondary Efforts 230 with the Primary People 116 Element 101.

FIG. 15 builds on FIGS. 7 & 11 by defining that People Tertiary Owner 220 Elements 101 are associated to People Secondary Owners 212 Elements 101 by People to People Associations (PP-PP ASSOC) 136 which are stored in the Virtual Formulaic Data Matrix 102.

The People Tertiary Owner 220 Element 101 may be awarded the Tertiary People CPEI 204 when said People Tertiary Owner 220 Element 101 has the People Qualified Association for Tertiary Effort 236 with the People Secondary Owner 212 Element 101, wherein the People Secondary Owner 212 Element 101 has been awarded the Secondary People CPEI 196, and wherein the People Tertiary Owner 220 People Qualified Association for Tertiary Effort 236 has contributed to the People Secondary Owner 212 in achieving their Secondary People CPEI 196.

FIG. 15 also establishes that the People Qualified Association for Tertiary Effort 236 between the People Tertiary Owner 220 Element 101 and the People Secondary Owner 212 Element 101 are considered a Tertiary Efforts 350, wherein said Tertiary Effort 350 is the Formula Associative Data Value 115 that is stored within the Base Tables 314.

According to FIG. 15, the Tertiary People CPEI 204 Report is derived and reported from an association between the People Tertiary Owner 220 and the People Secondary Owner 212, wherein the Effort Instance 186 that stores the Primary People CPEI 188 is updated with the People Qualified Association for Tertiary Effort 236 that ties the People Tertiary Owner 220 to the People Secondary Owner 212.

Said Effort Instances 186 therefore contain the People Tertiary Owner's 220 People Qualified Association for Tertiary Effort 236 to the People Secondary Owner 212, the People Secondary Owner's 212 People Qualified Association for Secondary Efforts 228 to the Primary People 116, and the multiple Element 101 associations that are used to generate the Primary People CPEI 188.

The Tertiary People CPEI 204 Report is reported from the Virtual Formulaic Data Matrix 102 according to CPEI Reporting Rules 324 for Tertiary People CPEI 204 including:

a who 442 ($3^{rd}$)—People Tertiary Owner 220
did what 444 ($3^{rd}$)—People Qualified Association 236 (Tertiary Effort 350)
a when 446 ($3^{rd}$)—Point in Phasetime (PiPT) 128 for Tertiary Effort 350
to assist
Who 430 ($2^{nd}$)—People Secondary Owner 212 (owner of Secondary People CPEI 196)
did What 432 ($2^{nd}$)—People Qualified Association 228 (People 116 Secondary Effort 229)
When 434 ($2^{nd}$)—Point In Phasetime (PiPT) 128 for Secondary Effort 229
in Support of
WHO 410—Primary People 116 (owner of Primary People CPEI 188)
did WHAT 412—Effort 153 (Role) 154
for WHOM 413—Primary Project 120 owner
WHERE 416—Primary Places 118
WHY 414—Primary Project 120
and HOW 418—Primary Objects 124
in relation to the WHEN 420—Point in Phasetime (PiPT) 128

FIG. 15 also acknowledges that the System and Method is comprised of the following rules for approving the People Qualified Associations for Tertiary Effort 236 used in generating Tertiary People CPEIs 204:

In order to create the Tertiary Effort 350, the Secondary Effort 229 must first exist.

The People Secondary Owner 212 Element 101 will have to approve the Tertiary Effort 350

A Tertiary People CPEI 204 can be established when the People Tertiary Owner 220 Element 101 receives the approval of his People Qualified Association for Tertiary Effort 236 to the People Secondary Owner 212 who has the approved Secondary People CPEI 196.

The owner of the Project 120 which is the subject of the Primary People CPEI 188 can disapprove the Tertiary Effort 350.

The People Secondary Owner 212 will have to approve the People Qualified Association for Tertiary Effort 236 between it and the People Tertiary Owner 220.

The People Tertiary Owner 220 must provide some type of proof (such as a document or data) that affirms their association to the People Secondary Owner 212.

FIG. 16 is a diagram illustrating how a Tertiary Places CPEI 206 Report is derived and reported for a Places Tertiary Owner 222 Element 101 through a Places Qualified Association for Tertiary Efforts 238 with a People Secondary Owner 212 Element 101, wherein said People Secondary Owner 212 has a Secondary. People CPEI 196 derived through the Places Qualified Associations for Secondary Effort 230 with the Primary People 116 Element 101.

FIG. 16 builds on FIGS. 8 & 12 by defining that Places Tertiary Owner 222 Elements 101 are associated to People Secondary Owners 212 Elements 101 by People to Places Associations (PP-PL ASSOC) 138 which are stored in the Virtual Formulaic Data Matrix 102.

A Places Tertiary Owner 222 Element 101 may be awarded the Tertiary Places CPEI 206 when said Places Tertiary Owner 222 Element 101 has the Places Qualified Association for Tertiary Efforts 238 with a People Secondary Owner 212 Element 101, wherein the People Secondary Owner 212 Element 101 has been awarded a Secondary People CPEI 196, and wherein the Places Tertiary Owner 222 Places Qualified Association for Tertiary Efforts 238 has contributed to the People Secondary Owner 212 in achieving their Secondary People CPEI 196.

FIG. 16 also establishes that the Places Qualified Association for Tertiary Efforts 238 between the Places Tertiary Owner 222 Element 101 and the People Secondary Owner 212 Element 101 are considered Tertiary Efforts 350, wherein said Tertiary Effort 350 is the Formula Associative Data Value 115 that is stored within Base Tables 314.

According to FIG. 16, the Tertiary Places CPEI 206 Report is derived and reported from an association between the Places Tertiary Owner 222 and the People Secondary Owner 212, wherein the Effort Instance 186 that stores the Primary People CPEI 188 is updated with the Places Qualified Association for Tertiary Efforts 238 that ties the Places Tertiary Owner 222 to the People Secondary Owner 212.

Said Effort Instances 186 therefore contain the Places Tertiary Owner's 222 Places Qualified Association for Tertiary Efforts 238 to the People Secondary Owner 212, the People Secondary Owner's 212 People Qualified Association for Secondary Efforts 228 to the Primary People 116, and the multiple Element 101 associations that are used to generate the Primary People CPEI 188.

The Tertiary Places CPEI 206 Report is reported from the Virtual Formulaic Data Matrix 102 according to CPEI Reporting Rules 324 for Tertiary Places CPEI 206 including:
a where 448 ($3^{rd}$)—Places Tertiary Owner 222
did what 444 ($3^{rd}$)—Places Qualified Association 238 (Tertiary Effort 350)
when 446 ($3^{rd}$)—Point in Phasetime (PiPT) 128 for Tertiary Effort 350
to assist
Who 430 ($2^{nd}$)—People Secondary Owner 212 (owner of Secondary People CPEI 196)
did What 432 ($2^{nd}$)—People Qualified Association 228 (People 116 Secondary Effort 229)
When 434 ($2^{nd}$)—Point In Phasetime (PiPT) 128 for Secondary Effort 229
in Support of
WHO 410—Primary People 116 (owner of Primary People CPEI 188)
did WHAT 412—Effort 153 (Role) 154
for WHOM 413—Primary Project 120 owner
WHERE 416—Primary Places 118
WHY 414—Primary Project 120
and HOW 418—Primary Objects 124
in relation to the WHEN 420–Point in Phasetime (PiPT) 128

FIG. 16 also acknowledges that the System and Method is comprised of the following rules for approving the Places Qualified Associations for Tertiary Efforts 238 used in generating Tertiary Places CPEIs 206:
In order to create the Tertiary Effort 350, the Secondary Effort 229 must first exist.
The People Secondary Owner 212 Element 101 will have to approve the Tertiary Effort 350
A Tertiary Places CPEI 206 can be established when the Places Tertiary Owner 222 Element 101 receives the approval of their Places Qualified Association for Tertiary Efforts 238 to the People Secondary Owner 212 who has an approved Secondary People CPEI 196.
The owner of the Project 120 which is the subject of the Primary People CPEI 188 can disapprove the Tertiary Effort 350.
The People Secondary Owner 212 will have to approve the Places Qualified Association for Tertiary Efforts 238 between it and the Places Tertiary Owner 222.
The Places Tertiary Owner 222 must provide some type of proof (such as a document or data) that affirms their association to the People Secondary Owner 212.

FIG. 17 is a diagram illustrating how a Tertiary Project CPEI 208 Report is derived and reported for a Projects Tertiary Owner 224 Element 101 through a Project Qualified Association for Tertiary Efforts 240 with the Project Secondary Owner 216 Element 101, wherein said Project Secondary Owner 216 has a Secondary Project CPEI 200 derived through the Project Qualified Associations for a Secondary Effort 232 with the Primary Project 120 Element 101.

FIG. 17 builds on FIGS. 9 & 13 by defining that Projects Tertiary Owners 224 Elements 101 are associated to Project Secondary Owners 216 Elements 101 by Project to Project Associations (PR-Contribution) 158 which are stored in the Virtual Formulaic Data Matrix 102.

The Projects Tertiary Owner 224 Element 101 may be awarded the Tertiary Project CPEI 208 when said Projects Tertiary Owner 224 Element 101 has the Project Qualified Association for Tertiary Efforts 240 with the Project Secondary Owner 216 Element 101, wherein the Project Secondary Owner 216 Element 101 has been awarded a Secondary Project CPEI 200, and wherein the Projects Tertiary Owner's 224 Project Qualified Association for Tertiary Efforts 240 has contributed to the Project Secondary Owner 216 in achieving their Secondary People CPEI 196.

FIG. 17 also establishes that the Project Qualified Association for Tertiary Efforts 240 between the Projects Tertiary Owner 224 Element 101 and the Project Secondary Owner 216 Element 101 are considered Tertiary Efforts 350, wherein said Tertiary Effort 350 is the Formula Associative Data Value 115 that is stored within Base Tables 314.

According to FIG. 17, the Tertiary Project CPEI 208 Report is derived and reported from an association between the Projects Tertiary Owner 224 and the Project Secondary Owner 216, wherein the Effort Instance 186 that stores the Primary Project CPEI 192 is updated with the Project Qualified Association for Tertiary Efforts 240 that ties the Projects Tertiary Owner 224 to the Project Secondary Owner 216.

Said Effort Instances 186 therefore contain the Projects Tertiary Owner's 224 Project Qualified Association for Tertiary Efforts 240 to the Project Secondary Owner 216, the Project Secondary Owner's 216 Project Qualified Association for Secondary Effort 232 to the Primary Project 120, and the multiple Element 101 associations that are used to generate a Primary Project CPEI 192.

The Tertiary Project CPEI 208 Report is reported from the Virtual Formulaic Data Matrix 102 according to CPEI Reporting Rules 324 for Tertiary Project CPEI 208 including:
a why 450 ($3^{rd}$)—Projects Tertiary Owner 224
did what 444 ($3^{rd}$)—Projects Qualified Association 240 (Tertiary Effort 350)
when 446 ($3^{rd}$)—Point in Phasetime (PiPT) 128 for Tertiary Effort 350
to assist
Who 430 ($2^{nd}$)—People Secondary Owner 212 (owner of Secondary People CPEI 196)
did What 432 ($2^{nd}$)—People Qualified Association 228 (People 116 Secondary Effort 229)
When 434 ($2^{nd}$)—Point In Phasetime (PiPT) 128 for Secondary Effort 229
in Support of
WHO 410—Primary People 116 (owner of Primary People CPEI 188)
did WHAT 412—Effort 153 (Role) 154
for WHOM 413—Primary Project 120 owner
WHERE 416—Primary Places 118
WHY 414—Primary Project 120
and HOW 418—Primary Objects 124
in relation to the WHEN 420—Point In Phasetime (PiPT) 128

FIG. 17 also acknowledges that the System and Method is comprised of the following rules for approving the Project Qualified Associations for Tertiary Efforts 240 used in generating Tertiary Project CPEIs 208:
In order to create the Tertiary Effort 350, the Secondary Effort 229 must first exist.
The Project Secondary Owner 216 Element 101 will have to approve the Tertiary Effort 350

A Tertiary Project CPEI 208 can be established when the Projects Tertiary Owner 224 Element 101 receives the approval of their Project Qualified Association for Tertiary Efforts 240 to the Project Secondary Owner 216 who has the approved Secondary Project CPEI 200.

The owner of the Project 120 which is the subject of the Primary Project CPEI 192 can disapprove the Tertiary Effort 350.

The Project Secondary Owner 216 will have to approve the Project Qualified Association for Tertiary Efforts 240 between it and the Projects Tertiary Owner 224.

The Projects Tertiary Owner 224 must provide some type of proof (such as a document or data) that affirms their association to the Project Secondary Owner 216.

FIG. 18 is a diagram illustrating how a Tertiary Object CPEI 210 Report is derived and reported for an Objects Tertiary Owner 226 Element 101 through an Object Qualified Association for Tertiary Efforts 242 with the People Secondary Owner 212 Element 101, wherein said People Secondary Owner 212 has a Secondary People CPEI 196 derived through the Places Qualified Associations for Secondary Efforts 230 with the Primary People 116 Element 101.

FIG. 18 builds on FIGS. 10 & 14 by defining that Objects Tertiary Owner 226 Elements 101 are associated to People Secondary Owners 212 Elements 101 by People to Objects Associations (PP-OB ASSOC) 142 which are stored in the Virtual Formulaic Data Matrix 102.

The Objects Tertiary Owner 226 Element 101 may be awarded the Tertiary Object CPEI 210 when said Objects Tertiary Owner 226 Element 101 has the Object Qualified Association for Tertiary Efforts 242 with the People Secondary Owner 212 Element 101, wherein the People Secondary Owner 212 Element 101 has been awarded a Secondary People CPEI 196, and wherein the Objects Tertiary Owner 226 Object Qualified Association for Tertiary Efforts 242 has contributed to the People Secondary Owner 212 in achieving their Secondary People CPEI 196.

FIG. 18 also establishes that the Object Qualified Association for Tertiary Efforts 242 between the Objects Tertiary Owner 226 Element 101 and the People Secondary Owner 212 Element 101 are considered Tertiary Efforts 350, wherein said Tertiary Effort 350 is the Formula Associative Data Value 115 that is stored within Base Tables 314.

According to FIG. 18, the Tertiary Object CPEI 210 Report is derived and reported from an association between the Objects Tertiary Owner 226 and the People Secondary Owner 212, wherein the Effort Instance 186 that stores the Primary People CPEI 188 is updated with the Object Qualified Association for Tertiary Efforts 242 that ties the Objects Tertiary Owner 226 to the People Secondary Owner 212.

Said Effort Instances 186 therefore contain the Objects Tertiary Owner's 226 Object Qualified Association for Tertiary Efforts 242 to the People Secondary Owner 212, the People Secondary Owner's 212 People Qualified Association for Secondary Efforts 228 to the Primary People 116, and the multiple Element 101 associations that are used to generate the Primary People CPEI 188.

The Tertiary Object CPEI 210 Report is reported from the Virtual Formulaic Data Matrix 102 according to CPEI Reporting Rules 324 for Tertiary Object CPEI 204 including:

a how 452 ($3^{rd}$)—Objects Tertiary Owner 226
did what 444 ($3^{rd}$)—Objects Qualified Association 242 (Tertiary Effort 350)
when 446 ($3^{rd}$)—Point in Phasetime (PiPT) 128 for Tertiary Effort 350
to assist Who 430 ($2^{nd}$)—People Secondary Owner 212 (owner of Secondary People CPEI 196)
did What 432 ($2^{nd}$)—People Qualified Association 228 (People 116 Secondary Effort 229)
When 434 ($2^{nd}$)—Point In Phasetime (PiPT) 128 for Secondary Effort 229
in Support of
WHO 410—Primary People 116 (owner of Primary People CPEI 188)
did WHAT 412—Effort 153 (Role) 154
for WHOM 413—Primary Project 120 owner
WHERE 416—Primary Places 118
WHY 414—Primary Project 120
and HOW 418—Primary Objects 124
in relation to the WHEN 420—Point in Phasetime (PiPT) 128

FIG. 18 also acknowledges that the System and Method is comprised of the following rules for approving the Object Qualified Associations for Tertiary Efforts 242 used in generating Tertiary Object CPEIs 210:

In order to create the Tertiary Effort 350, the Secondary Effort 229 must first exist.

The People Secondary Owner 212 Element 101 will have to approve the Tertiary Effort 350

A Tertiary Object CPEI 210 can be established when the Objects Tertiary Owner 226 Element 101 receives the approval of their Object Qualified Association for Tertiary Efforts 242 to the People Secondary Owner 212 who has an approved Secondary People CPEI 196.

The owner of the Project 120 which is the subject of the Primary People CPEI 188 can disapprove the Tertiary Effort 350.

The People Secondary Owner 212 will have to approve the Object Qualified Association for Tertiary Efforts 242 between it and the Objects Tertiary Owner 226.

The Objects Tertiary Owner 226 must provide some type of proof (such as a document or data) that affirms their association to the People Secondary Owner 212.

FIG. 19 is a diagram illustrating how a People Auto CPEI Reports 246 are derived and reported for People 116 Elements 101 according to the "Formulaic Effort Instance Conjoined Project Effort Display Reporting Method and System Thereof".

According to FIG. 19 the People Auto CPEI Reports 246 will be generated if:

The Places (PL) 118 Element 101 that has a Primary Places CPEI 190 has submitted a People 116 Element 101 along with the People's 116 Effort 153 (Role) 154 on the Project 120 as part of their Primary Places CPEI 190, wherein the People 116 Element 101 had not previously submitted their Effort 153 (Role) 154 on the Project 120 or the People 116 Element 101 is unknown.

The Project (PR) 120 Element 101 that has a Primary Project CPEI 192 has submitted the People 116 Element 101 along with the People's 116 Effort 153 (Role) 154 on the Project as part of their Primary Project CPEI 192, wherein the People 116 Element 101 had not previously submitted their Effort 153 (Role) 154 on the Project 120 or the People 116 Element 101 is unknown.

The Object (OB) 124 Element 101 that has a Primary Object CPEI 194 has submitted the People 116 Element 101 along with the People's Effort 153 (Role) 154 on the Project as part of their Primary Object CPEI 194, wherein the People 116 Element 101 had not previously submitted their Effort 153 (Role) 154 on the Project 120 or the People 116 Element 101 is unknown.

FIG. 19 also illustrates that People Auto CPEI Reports 246 are generated for a People Auto Owner 248 via a People Auto Effort Modules 244, wherein said People Auto Effort Modules 244 output Formulaic Primary Data Fields 330 from Effort Instances 186 within the Virtual Formulaic Data Matrix 102 according to CPEI Reporting Rules 324 for People Auto CPEI Reports 246 including:

People Auto CPEI Reports 246 are generated by the System's Method through associations that are input by someone other than the People Auto Owner 248. These are defined as a Reciprocating Associations 368 which are stored in Base Tables 314 within the Virtual Formulaic Data Matrix 102.

FIG. 20 is a diagram illustrating how a Places Auto CPEI Reports 252 are derived and reported for Places 118 Elements 101 according to the "Formulaic Effort Instance Conjoined Project Effort Display Reporting Method and System Thereof".

According to FIG. 20 the Places Auto CPEI Reports 252 will be generated if:

The People (PP) 116 Element 101 that has the Primary People CPEI 188 has submitted the Places 118 Element 101 along with the Place's 118 Effort 153 (Services) 156 on the Project 120 as part of their Primary People CPEI 188, wherein the Places 118 Element 101 had not previously submitted their Effort 153 (Services) 156 on the Project 120 or the Places 118 Element 101 is unknown.

The Project (PR) 120 Element 101 that has the Primary Project CPEI 192 has submitted the Places 118 Element 101 along with the Place's 118 Effort 153 (Services) 156 on the Project 120 as part of their Primary Project CPEI 192, wherein the Places 118 Element 101 had not previously submitted their Effort 153 (Services) 156 on the Project 120 or the Places 118 Element 101 is unknown.

The Object (OB) 124 Element 101 that has a Primary Object CPEI 194 has submitted the Places 118 Element 101 along with the Place's 118 Effort 153 (Services) 156 on the Project 120 as part of their Primary Object CPEI 194, wherein the Places 118 Element 101 had not previously submitted their Effort 153 (Services) 156 on the Project 120 or the Places 118 Element 101 is unknown.

FIG. 20 also illustrates that Places Auto CPEI Reports 252 are generated for Places Auto Owner 254 via a Places Auto Effort Modules 250, wherein said Places Auto Effort Modules 250 output Formulaic Primary Data Fields 330 from Effort Instances 186 within the Virtual Formulaic Data Matrix 102 according to CPEI Reporting Rules 324 for Places Auto CPEI Reports 252 including:

Places Auto CPEI Reports 252 are generated by the System's Method through associations that are input by someone other the Places 118 owner. These are defined as Reciprocating Associations 368 which are stored in Base Tables 314 within the Virtual Formulaic Data Matrix 102

FIG. 21 is a diagram illustrating how a Project Auto CPEI Reports 258 are derived and reported for Project 120 Elements 101 according to the "Formulaic Effort Instance Conjoined Project Effort Display Reporting Method and System Thereof".

According to FIG. 21 the Project Auto CPEI Report 258 will be generated if:

The People (PP) 116 Element 101 that has the Primary People CPEI 188 has submitted the Project 120 Element 101 along with the Project's 120 Effort 153 (Contribution 158) on another Project 120 as part of their Primary People CPEI 188, wherein the Project 120 Element 101 had not previously submitted their Effort 153 (Contribution) 158 on the Project 120 or the Project 120 Element 101 is unknown.

The Places (PL) 118 Element 101 that has a Primary Places CPEI 190 has submitted the Project 120 Element 101 along with the Project's 120 Effort 153 (Contribution) 158 on another Project 120 as part of their Primary Places CPEI 190, wherein the Project 120 Element 101 had not previously submitted their Effort 153 (Contribution) 158 on the Project 120 or the Project 120 Element 101 is unknown.

The Object (OB) 124 Element 101 that has a Primary Object CPEI 194 has submitted the Project 120 Element 101 along with the Project's 120 Effort 153 (Contribution) 158 on another Project 120 as part of their Primary Object CPEI 194, wherein the Project 120 Element 101 had not previously submitted their Effort 153 (Contribution) 158 on the Project 120 or the Project 120 Element 101 is unknown.

FIG. 21 also illustrates that Project Auto CPEI Reports 258 are generated for Project Auto Owner 260 via a Projects Auto Effort Modules 256 wherein said Projects Auto Effort Modules 256 output Formulaic Primary Data Fields 330 from Effort Instances 186 within the Virtual Formulaic Data Matrix 102 according CPEI Reporting Rules 324 for Project Auto CPEI Reports 258 including:

Project Auto CPEI Reports 258 are generated by the System's Method through associations that are input by someone other the Project 120 owner. These are defined as Reciprocating Associations 368 which are stored in Base Tables 314 within the Virtual Formulaic Data Matrix 102

FIG. 22 is a diagram illustrating how an Object Auto CPEI Reports 264 are derived and reported for Object 124 Elements 101 according to the "Formulaic Effort Instance Conjoined Project Effort Display Reporting Method and System Thereof".

According to FIG. 22 the Object Auto CPEI Reports 264 will be generated if:

The People (PP) 116 Element 101 that has the Primary People CPEI 188 has submitted the Object 124 Element 101 along with the Object's 124 Effort 153 (Utilization) 160 on another Project 120 as part of their Primary People CPEI 188, wherein the Object 124 Element 101 had not previously submitted their Effort 153 (Utilization) 160 on the Project 120 or the Object 124 Element 101 is unknown.

The Places (PL) 118 Element 101 that has a Primary Places CPEI 190 has submitted the Object 124 Element 101 along with the Object's 124 Effort 153 (Utilization) 160 on another Project 120 as part of their Primary Places CPEI 190, wherein the Object 124 Element 101 had not previously submitted their Effort 153 (Utilization) 160 on the Project 120 or the Object 124 Element 101 is unknown.

The Project (PR) 120 Element 101 that has the Primary Project CPEI 192 has submitted the Object 124 Element 101 along with the Object's 124 Effort 153 (Utilization) 160 on another Project 120 as part of their Primary Project CPEI 192, wherein the Object 124 Element 101 had not previously submitted their Effort 153 (Utilization) 160 on the Project 120 or the Object 124 Element 101 is unknown.

FIG. 22 also illustrates that Object Auto CPEI Reports 264 are generated for Object Auto Owner 266 via an Object Auto Effort Modules 262, wherein said Object Auto Effort Modules 262 output Formulaic Primary Data Fields 330 from Effort Instances 186 within the Virtual Formulaic Data Matrix 102 according CPEI Reporting Rules 324 for Object Auto CPEI Reports 264 including:

Object Auto CPEI Reports 264 are generated by the System's Method through associations that are input by someone other the Object 124 owner. These are defined as Reciprocating Associations 368 which are stored in Base Tables 314 within the Virtual Formulaic Data Matrix 102

FIG. 23 also illustrates that a People Auto Inference Effort 270, a Places Auto Inference Effort 272, a Project Auto Inference Effort 274, and an Object Auto Inference Effort 276 are generated for Elements 101, wherein said Auto Inference Efforts 270 272 274 276 are derived from Inferred associated data output from Effort Instances 186 within the Virtual Formulaic Data Matrix 102 according to the following a Rules For Auto Inferences 268:

1. Auto Inference Associations 367 are associations automatically generated by the System when two Elements 101 have Efforts 153 on the common Project 120 at the common Point in Phasetime (PiPT) 128.
2. Auto Inference Associations 367 are not stored in the tables in the Virtual Formulaic Data Matrix 102.
3. Auto Inference Associations 367 are considered unverified associations as the association has not been verified.
4. If an Auto Inference Association 367 is confirmed by the Element 101 in the Inferred association, the Element 101 can request that it be converted to the Primary CPEI 188 190 192 194.

FIG. 23 also defines that Auto Inference Associations 367 can only occur between Elements 101 within two Effort Instances 186 who share the common Project (PR) 120 and the Point in Phasetime (PiPT) 128. Said Elements 101 include:

People (PP) 116
A People2 (PP2) 130
Places (PL) 118
Places2 (PL2) 132
Projects (PR) 120
Project2 (PR2) 122
Objects (OB) 124
Object2 (OB2) 134

FIG. 23 also stipulates that People Auto Inference Efforts 270, Places Auto Inference Efforts 272, Projects Auto Inference Efforts 274, and Objects Auto Inference Efforts 276 are generated from the above Element 101 based on the so stated Rules for Auto Inferences 268.

FIG. 24 is a diagram that illustrates the various Virtual Formulaic Data Matrix 102 reporting modules used to generate and report Primary CPEI 188 190 192 194 data, Secondary CPEI 196 198 200 202 data, and Tertiary CPEI 204 206 208 210 data for each Element 101 entered via a Data Inputting System 310 and reported in response to a query utilizing a Data Querying System 312 according to established "Formulaic Conjoined Project Effort Instance Display Method and Search System Process Thereof" rules.

According to FIG. 24, the Virtual Formulaic Data Matrix 102 outputs People 116 data within People 116 reports via the following modules:

A People Primary CPEI Modules 278—Output People (PP) 116 data within Primary People CPEI 188 reports.
A People Secondary CPEI Modules 280—Output People (PP) 116 data within Secondary People CPEI 196 reports.
A People Tertiary CICPE Modules 282—Output People (PP) 116 data within Tertiary People CPEI 204 reports.
People Auto Effort Modules 244—Output People (PP) 116 data within People Auto CPEI Reports 246.
A People Auto Inference Effort Modules 284—Output People (PP) 116 data within People Auto Inference Effort 270 reports.

FIG. 24 also illustrates that the Virtual Formulaic Data Matrix 102 outputs Places 118 data within Places 118 reports via the following modules:

A Places Primary CPEI Modules 286—Output Places (PL) 118 data within Primary Places CPEI 190 reports.
A Places Secondary CPEI Modules 288—Output Places (PL) 118 data within Secondary Places CPEI 198 reports.
A Places Tertiary CPEI Modules 290—Output Places (PL) 118 data within Tertiary Places CPEI 206 reports.
Places Auto Effort Modules 250—Output Places (PL) 118 data within Places Auto CPEI Reports 252.
A Places Auto Inference Effort Modules 292—Output Places (PL) Auto Inference data within Places Auto Inference Effort 272 reports.

FIG. 24 also illustrates that the Virtual Formulaic Data Matrix 102 outputs Projects 120 data within Project 120 reports via the following modules:

A Project Primary CPEI Modules 294—Output Project (PR) 120 data within Primary Project CPEI 192 reports.
A Project Secondary CPEI Modules 296—Output Project (PR) 120 data within Secondary Project CPEI 200 reports.
A Project Tertiary CPEI Modules 298—Output Project (PR) 120 data within Tertiary Project CPEI 208 reports.
Project Auto Effort Modules 256—Output Project (PR) 120 data within Project Auto CPEI Reports 258.
A Project Auto Inference Effort Modules 300—Output Project (PR) 120 data within Project Auto Inference Effort 274 reports.

FIG. 24 also illustrates that the Virtual Formulaic Data Matrix 102 outputs Object 124 data within Object 124 reports via the following modules:

An Object Primary CPEI Modules 302—Output Object (OB) 124 data within Primary Object CPEI 194 reports.
An Object Secondary CPEI Modules 304—Output Object (OB) 124 data within Secondary Object CPEI 202 reports.
An Object Tertiary CPEI Modules 306—Output Object (OB) 124 data within Tertiary Object CPEI 210 reports.
Object Auto Effort Modules 262—Output Object (OB) 124 data within Object Auto CPEI Reports 264.
An Object Auto Inference Effort Modules 308—Output Object (OB) 124 data within Object Auto Inference Effort 276 reports.

FIGS. 25A, 25B, 25C, and 25D are diagrams that illustrate the various Primary CPEI (People, Places, Projects, and Objects) 188 190 192 194 Displays graphically reporting attributes.

FIG. 25A illustrates that the Primary People CPEI 188 display includes Formulaic Primary Data Fields 330 which can include, but are not limited to, the following:

Primary People CPEI 188 owner name
Primary People CPEI 188 owner Effort 153 (Role) 154
Project 120 Name
Featured Individual (People 116) name
Featured Individual (People 116) type
Project 120 type
Project 120 genre
Project 120 runtime
Project 120 publication date
Project 120 owner name
Places 118 name
Objects 124 name FIG. 25B illustrates that a Primary Places CPEI 190 display includes Formulaic Primary Data Fields 330 which can include, but are not limited to, the following:

Primary Places CPEI 190 owner's name
Primary Places CPEI 190 owner's Effort 153 (Services) 156
Project's 120 name
Featured Individual (People 116) name
Featured Individual (People 116) type
Project's 120 type
Project's 120 genre
Project's 120 runtime
Project's 120 publication date
Project's 120 owner name
People's 116 name and Role 154
Places2 132 name
Object's 124 name FIG. 25C illustrates that a Primary Project CPEI 192 display includes Formulaic Primary Data Fields 330 which can include, but are not limited to, the following:

Primary Project CPEI 192 owner's name
Primary Project CPEI 192 owner's Effort 153 (Contribution) 158
Project's 120 name
Featured Individual (People 116) name
Featured Individual (People 116) type
Project's 120 type
Project's 120 genre
Project's 120 runtime
Project's 120 publication date
Project's 120 owner name
People's 116 name and Role 154
Place's 118 name
Object's 124 name FIG. 25D illustrates that a Primary Object CPEI 194 display includes Formulaic Primary Data Fields 330 which can include, but are not limited to, the following:

Primary Object CPEI 194 owner's name
Primary Object CPEI 194 owner's Effort 153 (Utilization) 160 Project's 120 name
Featured Individual (People 116) name
Featured Individual (People 116) type
Project's 120 type
Project's 120 genre
Project's 120 runtime
Project's 120 publication date
Project's 120 owner name
People's 116 name and Role 154
Place's 118 name
Object2 134 name According to FIG. 25A the Primary People CPEI 188 Displays will graphically display the following appendages:

A Primary Main Effort Body 376: Displays Formulaic Primary Data Fields 330 pertaining to the Project 120 and a Project Relational Data 174.
A Primary Lower Appendage One 378: Displays Formulaic Primary Data Fields 330 pertaining to the People 116 owner's Effort 153 (Role) 154, level rating, and the Point In Phasetime (PiPT) 128 in which the People 116 owner's Effort 153 (Role) 154 occurred.
A Primary Lower Appendage Two 380: Displays Formulaic Primary Data Fields 330 pertaining to the Places 118 and Object 124 who are associated to the People 116 owner by their Efforts 153 on the Project 120.

According to FIG. 25B the Primary Places CPEI 190 Displays will graphically display the following appendages:

Primary Main Effort Body 376: Displays Formulaic Primary Data Fields 330 pertaining to the Project 120 and Project Relational Data 174.
Primary Lower Appendage One 378: Displays Formulaic Primary Data Fields 330 pertaining to the Places 118 owner's Effort 153 (Services) 156, level rating, and the Point In Phasetime (PiPT) 128 in which the Places 118 owner's Effort 153 (Services) 156 occurred.
Primary Lower Appendage Two 380: Displays Formulaic Primary Data Fields 330 pertaining to the People 116, Places2 132, and Object 124 who are associated to the Places 118 owner by their Efforts 153 on the Project 120.

According to FIG. 25C the Primary Project CPEI 192 Displays will graphically display the following appendages:

Primary Main Effort Body 376: Displays Formulaic Primary Data Fields 330 pertaining to the Project2 122 (subject of the CPEI) and Project2's Project Relational Data 174.
Primary Lower Appendage One 378: Displays Formulaic Primary Data Fields 330 pertaining to the Project 120 owner's Effort 153 (Contribution) 158, level rating, and the Point In Phasetime (PiPT) 128 in which the Project 120 owner's Effort 153 (Contribution) 158 occurred.
Primary Lower Appendage Two 380: Displays Formulaic Data Fields 330 pertaining to the People 116, Places 118, and Object 124 who are associated to the Project 120 owner by their Efforts 153 on the Project2 122.

According to FIG. 25D the Primary Objects CPEI 194 Displays will graphically display the following appendages:

Primary Main Effort Body 376: Displays Formulaic Primary Data Fields 330 pertaining to the Project 120 and Project Relational Data 174.
Primary Lower Appendage One 378: Displays Formulaic Primary Data Fields 330 pertaining to the Object 124 owner's Effort 153 (Utilization) 160, level rating, and the Point In Phasetime (PiPT) 128 in which the Object 124 owner's Effort 153 (Utilization) 160 occurred.
Primary Lower Appendage Two 380: Displays Formulaic Primary Data Fields 330 pertaining to the People 116, Places 118, and Object2 134 who are associated to the Object 124 owner by their Efforts 153 on the Project 120.

FIGS. 25A, 25B, 25C, and 25D also establishes that said Formulaic Primary Data Fields 330 may be hyperlinks to additional data that can include, but are not limited to, the following:

Other Primary CPEI 188 190 192 194 Displays
Other Secondary CPEI 196 198 200 202 Displays
Other Tertiary CPEI 204 206 208 210 Displays
E-commerce or consumer [Buy It Now] commerce websites
Other websites or web networks
Interactive reports
Other general effort data
Reviews
Ratings
Media (images, video, graphics, icons, etc.)

FIGS. 25A, 25B, 25C, and 25D also establish that said Formulaic Primary Data Fields 330 may access a Primary Rollover Messages 394 when a user "rolls over" or "mouse over" a particular Field. Said Rollover Messages may display, but are not limited to, the following:

Text Instructions
Hyperlinks to additional data
Media (images, video, graphics, icons, etc.)
Descriptions of hyperlinks FIGS. 26A, 26B, 26C, and 26D are diagrams that illustrate the various Secondary CPEI (People, Places, Projects, and Objects) 196 198 200 202 Displays graphically reporting attributes.

FIG. 26A illustrates that a Secondary People CPEI 196 display includes a Formulaic Secondary Data Fields 372 which can include, but are not limited to, the following:
  Secondary People CPEI 196 owner's name
  Secondary People CPEI 196 owner's Secondary Effort 229
  Secondary Point In Phasetime (PiPT) 128
  A Primary Element 340 name and Effort 153 on Primary Project 120
  Primary Project 120 name
  Featured Individual (People 116) Name
  Featured Individual (People 116) Type
  Primary Project 120 type
  Primary Project 120 genre
  Primary Project 120 runtime
  Primary Project 120 publication date FIG. 26B illustrates that a Secondary Places CPEI 198 display includes Formulaic Secondary Data Fields 372 which can include, but are not limited to, the following:
  Secondary Places CPEI 198 owner's name
  Secondary Places CPEI 198 owner's Secondary Effort 229
  Secondary Point In Phasetime (PiPT) 128
  Primary Element 340 name and Effort 153 on Primary Project 120
  Primary Project 120 name
  Featured Individual (People 116) Name
  Featured Individual (People 116) Type
  Primary Project 120 type
  Primary Project 120 genre
  Primary Project 120 runtime
  Primary Project 120 publication date FIG. 26C illustrates that a Secondary Project CPEI 200 display includes Formulaic Secondary Data Fields 372 which can include, but are not limited to, the following:
  Secondary Project CPEI 200 owner's name
  Secondary Project CPEI 200 owner's Secondary Effort 229
  Secondary Point In Phasetime (PiPT) 128
  Primary Element 340 name and Effort 153 on Primary Project 120
  Primary Project 120 name
  Featured Individual (People 116) Name
  Featured Individual (People 116) Type
  Primary Project 120 type
  Primary Project 120 genre
  Primary Project 120 runtime
  Primary Project 120 publication date FIG. 26D illustrates that a Secondary Object CPEI 202 display includes Formulaic Secondary Data Fields 372 which can include, but are not limited to, the following:
  Secondary Object CPEI 202 owner's name
  Secondary Object CPEI 202 owner's Secondary Effort 229
  Secondary Point In Phasetime (PiPT) 128
  Primary Element 340 name and Effort 153 on Primary Project 120
  Primary Project 120 name
  Featured Individual (People 116) Name
  Featured Individual (People 116) Type
  Primary Project 120 type
  Primary Project 120 genre
  Primary Project 120 runtime
  Primary Project 120 publication date According to FIG. 26A the Secondary People CPEI Displays 196 will graphically display the following appendages:
  Secondary Main Effort Body 382: Displays Formulaic Secondary Data Fields 372 pertaining to the Primary Project 120 and Primary Project Relational Data 174.
  A Secondary Main Body Appendage One 384: Displays the Formulaic Secondary Data Fields 372 pertaining to the Primary Element 340 to which the People 116 owner is associated along with said Primary Element 340 owner's Effort 153 on the Primary Project 120, the Primary Element's 340 level rating, and the Point In Phasetime (PiPT) 128 in which the Primary Element's 340 Effort 153 occurred.
  A Secondary Main Body Appendage Two 386: Displays the Formulaic Secondary Data Fields 372 pertaining to the People 116 owner's Secondary Effort 229, level rating, and the Point In Phasetime (PiPT) 128 in which the Secondary Effort 229 occurred.

According to FIG. 26B the Secondary Places CPEI 198 Displays will graphically display the following appendages:
  Secondary Main Effort Body 382: Displays Formulaic Secondary Data Fields 372 pertaining to the Primary Project 120 and Primary Project Relational Data 174.
  Secondary Main Body Appendage One 384: Displays the Formulaic Secondary Data Fields 372 pertaining to the Primary Element 340 to which the Places 118 owner is associated along with said Primary Element 340 owner's Effort 153 on the Primary Project 120, the Primary Element's 340 level rating, and the Point In Phasetime (PiPT) 128 in which the Primary Element's 340 Effort 153 occurred.
  Secondary Main Body Appendage Two 386: Displays the Formulaic Secondary Data Fields 372 pertaining to the Places 118 owner's Secondary Effort 229, level rating, and the Point In Phasetime (PiPT) 128 in which the Secondary Effort 229 occurred.

According to FIG. 26C the Secondary Project CPEI 200 Displays will graphically display the following appendages:
  Secondary Main Effort Body 382: Displays Formulaic Secondary Data Fields 372 pertaining to the Primary Project 120 and Primary Project Relational Data 174.
  Secondary Main Body Appendage One 384: Displays the Formulaic Secondary Data Fields 372 pertaining to the Primary Element 340 to which the Project 120 owner is associated along with said Primary Element 340 owner's Effort 153 on the Primary Project2 122 (subject of the Primary CPEI), the Primary Element's 340 level rating, and the Point In Phasetime (PiPT) 128 in which the Primary Element's 340 Effort 153 occurred.
  Secondary Main Body Appendage Two 386: Displays the Formulaic Secondary Data Fields 372 pertaining to the Project 120 owner's Secondary Effort 229, level rating, and the Point In Phasetime (PiPT) 128 in which the Secondary Effort 229 occurred.

According to FIG. 26D the Secondary Object CPEI 202 Displays will graphically display the following appendages:
  Secondary Main Effort Body 382: Displays Formulaic Secondary Data Fields 372 pertaining to the Primary Project 120 and Primary Project Relational Data 174.
  Secondary Main Body Appendage One 384: Displays the Formulaic Secondary Data Fields 372 pertaining to the Primary Element 340 to which the Object 124 owner is associated along with said Primary Element 340 owner's Effort 153 on the Primary Project 120, the Primary Element's 340 level rating, and the Point In Phasetime (PiPT) 128 in which the Primary Element's 340 Effort 153 occurred.

Secondary Main Body Appendage Two 386: Displays the Formulaic Secondary Data Fields 372 pertaining to the Object 124 owner's Secondary Effort 229, level rating, and the Point In Phasetime (PiPT) 128 in which the Secondary Effort 229 occurred.

FIGS. 26A, 26B, 26C, and 26D also establishes that said Formulaic Secondary Data Fields 372 may be hyperlinks to additional data that can include, but are not limited to, the following:
- Other Primary CPEI 188 190 192 194 Displays
- Other Secondary CPEI 196 198 200 202 Displays
- Other Tertiary CPEI 204 206 208 210 Displays
- E-Commerce or consumer [Buy It Now] commerce sites
- Interactive reports
- Other general effort data
- Reviews
- Ratings
- Media (images, video, graphics, icons, etc.)

FIGS. 26A, 26B, 26C, and 26D also establish that said Formulaic Secondary Data Fields 372 may access a Secondary Rollover Messages 396 when a user "rolls over" or "mouse over" a particular Field. Said Rollover Messages may display, but are not limited to, the following:
- Text Instructions
- Hyperlinks to additional data
- Media (images, video, graphics, icons, etc.)
- Descriptions of hyperlinks FIGS. 27A, 27B, 27C, and 27D are diagrams that illustrates the various Tertiary CPEI (People, Places, Projects, and Objects) 204 206 208 210 Displays graphically reporting attributes.

FIG. 27A illustrates that the Tertiary People CPEI 204 display includes a Formulaic Tertiary Data Fields 374 which can include, but are not limited to, the following:
- Tertiary People CPEI 204 owner's name
- Tertiary People CPEI 204 owner's Tertiary Effort 350
- Tertiary Point In Phasetime (PiPT) 128
- Secondary Element 341 name and Secondary Effort 229
- Primary Element 340 name and Effort 153 on Primary Project 120
- Primary Project 120 name
- Featured Individual (People 116) Name
- Featured Individual (People 116) Type
- Primary Project 120 type
- Primary Project 120 genre
- Primary Project 120 runtime
- Primary Project 120 publication date FIG. 27B illustrates that the Tertiary Places CPEI 206 display includes Formulaic Tertiary Data Fields 374 which can include, but are not limited to, the following:
- Tertiary Places CPEI 206 owner's name
- Tertiary Places CPEI 206 owner's Tertiary Effort 350
- Tertiary Point In Phasetime (PiPT) 128
- Secondary Element 341 name and Secondary Effort 229
- Primary Element 340 name and Effort 153 on Primary Project 120
- Primary Project 120 name
- Featured Individual (People 116) Name
- Featured Individual (People 116) Type
- Primary Project 120 type
- Primary Project 120 genre
- Primary Project 120 runtime
- Primary Project 120 publication date FIG. 27C illustrates that the Tertiary Project CPEI 208 display includes Formulaic Tertiary Data Fields 374 which can include, but are not limited to, the following:
- Tertiary Project CPEI 208 owner's name
- Tertiary Project CPEI 208 owner's Tertiary Effort 350
- Tertiary Point In Phasetime (PiPT) 128
- Secondary Element 341 name and Secondary Effort 229
- Primary Element 340 name and Effort 153 on Primary Project 120
- Primary Project 120 name
- Featured Individual (People 116) Name
- Featured Individual (People 116) Type
- Primary Project 120 type
- Primary Project 120 genre
- Primary Project 120 runtime
- Primary Project 120 publication date FIG. 27D illustrates that a Tertiary Object CPEI 210 display includes Formulaic Tertiary Data Fields 374 which can include, but are not limited to, the following:
- Tertiary Object CPEI 210 owner's name
- Tertiary Object CPEI 210 owner's Tertiary Effort 350
- Tertiary Point In Phasetime (PiPT) 128
- Secondary Element 341 name and Secondary Effort 229
- Primary Element 340 name and Effort 153 on Primary Project 120
- Primary Project 120 name
- Featured Individual (People 116) Name
- Featured Individual (People 116) Type
- Primary Project 120 type
- Primary Project 120 genre
- Primary Project 120 runtime
- Primary Project 120 publication date According to FIG. 27A the Tertiary People CPEI 204 Displays will graphically display the following appendages:
- A Tertiary Main Effort Body 388: Displays Formulaic Tertiary Data Fields 374 pertaining to the Primary Project 120 and Primary Project Relational Data 174.
- A Tertiary Main Body Appendage One 390: Displays the Formulaic Tertiary Data Fields 374 pertaining to the Primary Element 340 to which the Secondary Element 341 is associated along with said Primary Element 340 owner's Effort 153 on the Primary Project 120, the Primary Element's 340 level rating, and the Point In Phasetime (PiPT) 128 in which the Primary Element's 340 Effort 153 occurred.
- A Tertiary Main Body Appendage Two 392: Displays the Formulaic Tertiary Data Fields 374 pertaining to the People 116 owner's Tertiary Effort 350, level rating, and the Point In Phasetime (PiPT) 128 in which the Tertiary Effort 350 occurred, as well as the Secondary Element 341 name, level rating, and Secondary Effort 229.

According to FIG. 27B the Tertiary Places CPEI 206 Displays will graphically display the following appendages:
- Tertiary Main Effort Body 388: Displays Formulaic Tertiary Data Fields 374 pertaining to the Primary Project 120 and Primary Project Relational Data 174.
- Tertiary Main Appendage One 390: Displays the Formulaic Tertiary Data Fields 374 pertaining to the Primary Element 340 to which the Secondary Element 341 is associated along with said Primary Element 340 owner's Effort 153 on the Primary Project 120, the Primary Element's 340 level rating, and the Point In Phasetime (PiPT) 128 in which the Primary Element's 340 Effort 153 occurred.
- Tertiary Main Body Appendage Two 392: Displays the Formulaic Tertiary Data Fields 374 pertaining to the Places 118 owner's Tertiary Effort 350, level rating, and the Point In Phasetime (PiPT) 128 in which the Tertiary Effort 350 occurred, as well as the Secondary Element 341 name, level rating, and Secondary Effort 229.

According to FIG. 27C the Tertiary Project CPEI 208 Displays will graphically display the following appendages:

Tertiary Main Effort Body 388: Displays Formulaic Tertiary Data Fields 374 pertaining to the Primary Project2 122 (subject of the Primary CPEI) and Primary Project2's Project Relational Data 174.

Tertiary Main Body Appendage One 390: Displays the Formulaic Tertiary Data Fields 374 pertaining to the Primary Element 340 to which the Secondary Element 101 is associated along with said Primary Element 340 owner's Effort 153 on the Primary Project 120, the Primary Element's 340 level rating, and the Point In Phasetime (PiPT) 128 in which the Primary Element's 340 Effort 153 occurred.

Tertiary Main Body Appendage Two 392: Displays the Formulaic Tertiary Data Fields 374 pertaining to the Project 120 owner's Tertiary Effort 350, level rating, and the Point In Phasetime (PiPT) 128 in which the Tertiary Effort 350 occurred, as well as the Secondary Element 341 name, level rating, and Secondary Effort 229.

According to FIG. 27D the Tertiary Object CPEI 210 Displays will graphically display the following appendages:

Tertiary Main Effort Body 388: Displays Formulaic Tertiary Data Fields 374 pertaining to the Primary Project 120 and Primary Project Relational Data 174.

Tertiary Main Body Appendage One 390: Displays the Formulaic Tertiary Data Fields 374 pertaining to the Primary Element 340 to which the Secondary Element 341 is associated along with said Primary Element 340 owner's Effort 153 on the Primary Project 120, Primary Element 340 level rating, and the Point In Phasetime (PiPT) 128 in which the Primary Element's 340 Effort 153 occurred.

Tertiary Main Body Appendage Two 392: Displays the Formulaic Tertiary Data Fields 374 pertaining to the Object 124 owner's Tertiary Effort 350, level rating, and the Point In Phasetime (PiPT) 128 in which the Tertiary Effort 350 occurred, as well as the Secondary Element 341 name, level rating, and Secondary Effort 229.

FIGS. 27A, 27B, 27C, and 27D also establishes that said Formulaic Tertiary Data Fields 374 may be hyperlinks to additional data that can include, but are not limited to, the following:

Other Primary CPEI 188 190 192 194 Displays

Other Secondary CPEI 196 198 200 202 Displays

Other Tertiary CPEI 204 206 208 210 Displays

E-Commerce or consumer [Buy It Now] commerce sites

Interactive reports

Other general effort data

Reviews

Ratings

Media (images, video, graphics, icons, etc.)

FIGS. 27A, 27B, 27C, and 27D also establish that said Formulaic Tertiary Data Fields 374 may access a Tertiary Rollover Messages 398 when a user "rolls over" or "mouse over" a particular Field. Said Rollover Messages may display, but are not limited to, the following:

Text Instructions

Hyperlinks to additional data

Media (images, video, graphics, icons, etc.)

Descriptions of hyperlinks

What is claimed is:

1. A live formulaic element effort event reporting method, comprising the steps of:
   (a) collecting element effort event data from a data source; and
   (b) reporting said element effort event data in a multitude of real time Formulaic Conjoined Project Effort Instance (CPEI) reports, wherein the step (b) further comprises the steps of:
   (b1) processing and storing said element effort event data in a core database of a computerized device by forming simple and complex associations between said element effort event data,
   (b2) receiving a CPEI data query to said core database from a user device;
   (b3) searching core database tables in response to said CPEI data query utilizing a CPEI data searching module; and
   (b4) generating a multitude of CPEI data in virtual system views in response to said CPEI data query by a CPEI data generating module.

2. The method, as recited in claim 1, after the step (b4), further comprising a step of:
   (b41) reporting said multitude of CPEI data in predefined, structured CPEI data reports from data view modules with virtual view tables.

3. The method, as recited in claim 2, wherein the step (b2) further comprises a step of inputting said element effort event data into said computerized device according to a prescribed formula for use in a multitude of element effort event data associations.

4. The method, as recited in claim 1, wherein the step (b1) further comprises the steps of:
   (b11) collecting said element effort event data on an effort instance to satisfy a plurality of predetermined who did what in phasetime element effort instance event formulas, per a formulae natural language semantic infrastructure, metaphorical formal and informal syntax, and CPEI report display rules (formulaic infrastructure and syntax display rules), said predetermined who did what in phasetime element effort instance event formulas, at least including:
   (i) who did what for whom, where, why, and how in relation to a point in phasetime (PiPT),
   (ii) where who did what for whom, where, why, and how in relation to a PiPT,
   (iii) why who did what for whom, where, why, and how in relation to a PiPT,
   (iv) how who did what for whom, where, why, and how in relation to a PiPT,
   (v) when who did what for whom, where, why and how in relation to a PiPT,
   (vi) who did what at a PiPT, in support of who did what for whom, where, why, and how in relation to a PiPT, and
   (vii) who did what at a PiPT, to assist who did what at a PiPT, in support of who did what for whom, where, why, and how in relation to a PiPT.

5. A formulaic virtual data matrix system built upon a core database, including:
   (i) a people (PP) primary CPEI module, a people secondary CPEI module, a people tertiary CPEI module, a people auto CPEI module, and a people auto inference module for reporting a past, present, and future people CPEI report,
   (ii) a places (PL) primary CPEI module, a places secondary CPEI module, a places Tertiary CPEI module, a places auto CPEI module, and a places auto inference module for reporting a past, present, and future places CPEI report, (iii) a project (PR) primary CPEI module, a project secondary CPEI module, a project tertiary CPEI module, a project auto CPEI module, and a project auto inference module for reporting a past, present, and future project CPEI report, and (iv) an object (OB) primary CPEI module, an object secondary CPEI module, an object tertiary CPEI module, an object auto CPEI module, and an object auto inference module for reporting a past, present, and future object CPEI report.

6. The system, as recited in claim 5, wherein said formulaic virtual data matrix system, upon query, automatically associates element effort event data to other said element effort event data according to their respective points in phasetime through simple and complex associations, enabling CPEI data generating modules to dynamically generate dimensional CPEI data reporting for a queried targeted element, wherein said CPEI data generating modules.

7. The system, as recited in claim 6, wherein the system reports dimensional CPEI data reports in a multitude of well-formatted, functional, and interaction designed published formulaic conjoined project effort instance report displays, per CPEI reporting system modules, and per formulaic infrastructure and syntax display rules.

8. The system, as recited in claim 7, wherein said CPEI report dataset displays information selected from a group consisting of:
    (i) element effort event data,
    (ii) element attributes,
    (iii) selected featured individuals,
    (iv) unfulfilled data field rollover messages,
    (v) hyperlinks from CPEI report displaying formula natural language primitives: who, what, whom, where, why, how, and PiPT, to other said element effort event data CPEI reports displaying, and
    (vi) who did what in phasetime programmed formulaic report displays for said primary CPEI, said secondary CPEI, and said tertiary CPEI.

9. The system, as recited in claim 8, wherein said formulaic report displays information selected from a group consisting of:
    (i) a main effort body displaying a project and project attributes for all said effort displays,
    (ii) at least two lower appendages for displaying primary efforts, a first appendage displaying said primary element name, said primary element effort, said primary effort level ratings, and said primary effort point in phasetime, and a second appendage displaying associated elements,
    (iii) at least two lower appendages for displaying said secondary efforts, a first appendage displaying said primary element name to which said secondary element effort is associated, along with said primary element effort, and said primary element effort level rating, and a second appendage displaying said secondary element name, said secondary element effort, and said secondary element effort point in phasetime,
    (iv) at least two lower appendages for displaying said tertiary efforts, a first appendage displaying said primary element name to which said secondary element effort is associated, along with said primary element effort, and said primary effort level rating, and a second appendage displaying said secondary element name to which said tertiary element effort is associated, said secondary effort, as well as said tertiary element name, said tertiary element effort and said tertiary element effort point in phasetime,
    (v) said well-formatted, functional, and interaction designed published formulaic CPEI report displays may vary in formula displayed data and content configuration according to said formulaic infrastructure and syntax display rules, and
    (vi) said well-formatted, functional, and interaction designed published formulaic CPEI report display appendages may vary in display order and alpha numeric line notation according to said formulaic infrastructure and syntax display rules.

10. A CPEI data searching method for reporting people, places, projects, and objects CPEI data, comprising the steps of:
    (a) presenting a CPEI data query to an industry core database via a CPEI data request (querying) module;
    (b) searching core base tables in said industry core database utilizing a CPEI data searching engine (module);
    (c) extracting data views utilizing a data view module;
    (d) processing said data views through a virtual formulaic data matrix module;
    (e) generating said CPEI data via a CPEI data generating module; and
    (f) reporting said CPEI data according to CPEI reporting rules, utilizing CPEI reporting system (module).

11. The method, as recited in claim 10, further comprising the steps of:
    (i) automatically generating CPEI element effort data that are able to be reported in a plurality of display formats;
    (ii) reporting CPEI element effort data in a formulaic linear display; and
    (iii) reporting said CPEI element effort data from a rollover, pop-up or hyperlink embedded within graphic images.

* * * * *